May 27, 1941.  D. G. GRISWOLD  2,243,815
WATER SOFTENING APPARATUS
Filed May 17, 1939   10 Sheets-Sheet 1
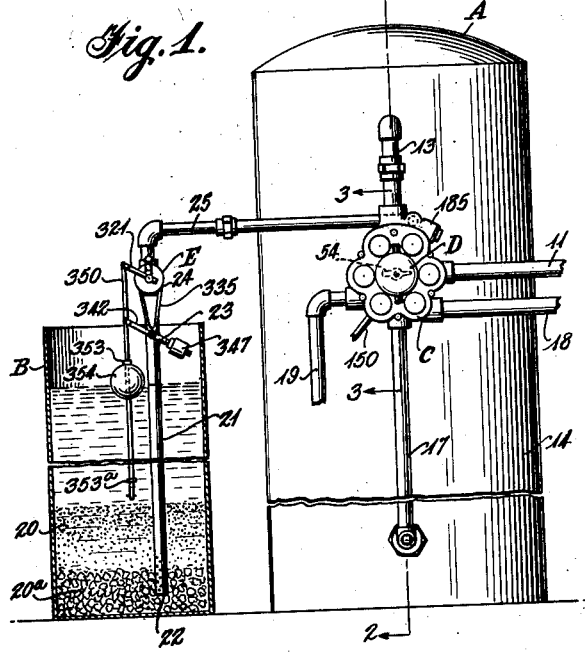
SERVICE FLOW
BACKWASH FLOW
SALT-RINSE FLOW
Inventor
Donald G. Griswold
By Bacon + Thomas
Attorneys

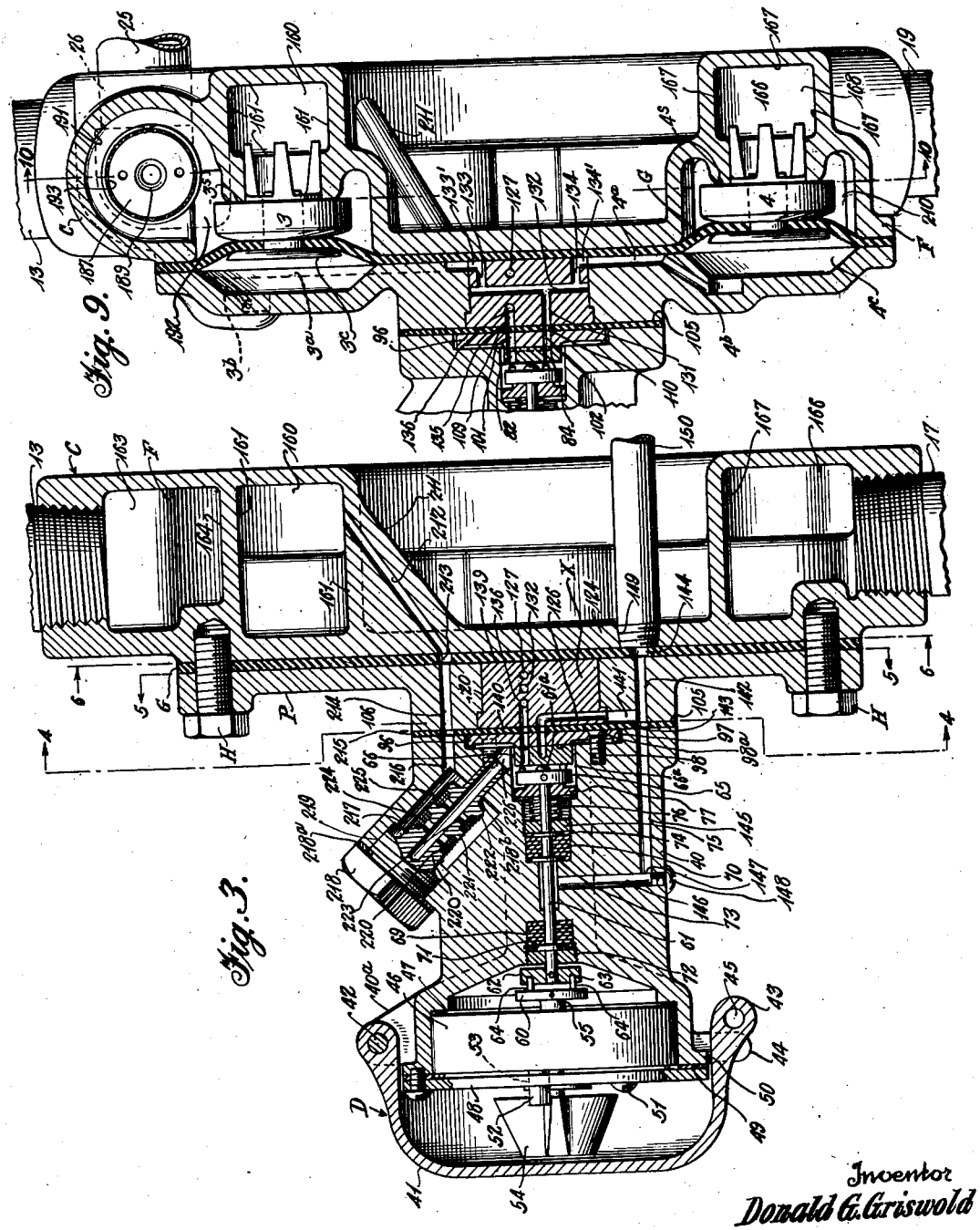

May 27, 1941.　　D. G. GRISWOLD　　2,243,815
WATER SOFTENING APPARATUS
Filed May 17, 1939　　10 Sheets-Sheet 3

Inventor
Donald G. Griswold
By Bacon + Thomas
Attorneys

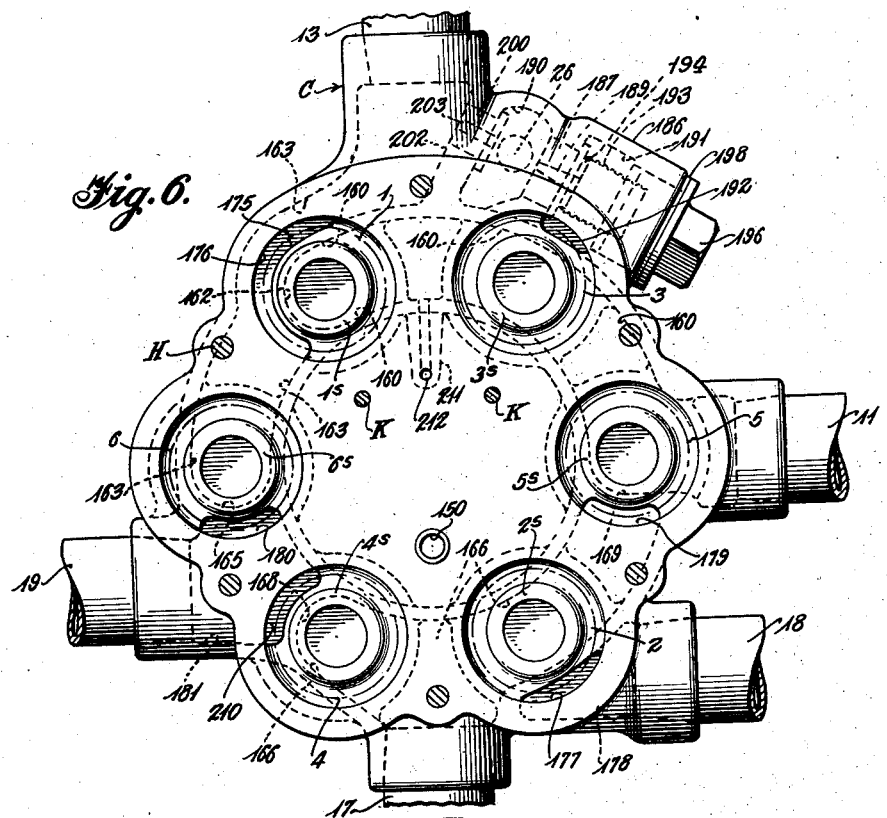

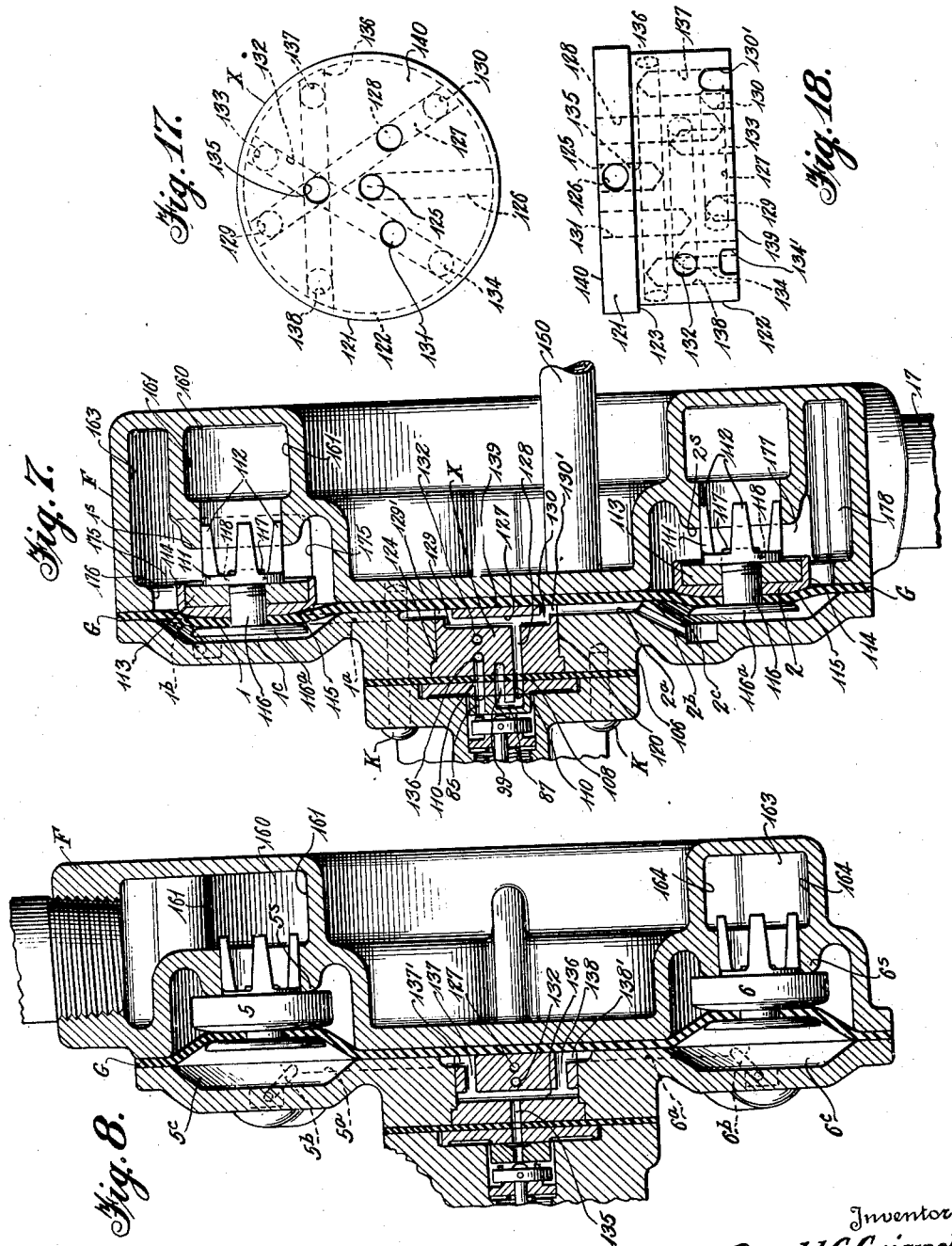

May 27, 1941. D. G. GRISWOLD 2,243,815
WATER SOFTENING APPARATUS
Filed May 17, 1939 10 Sheets-Sheet 6
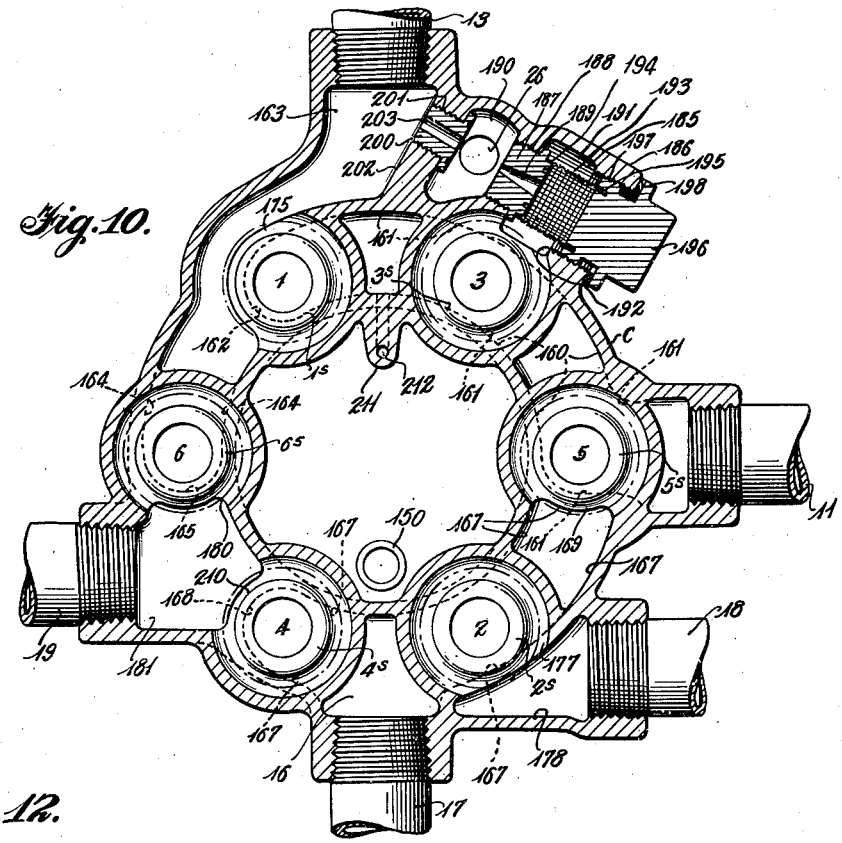
Fig. 10.
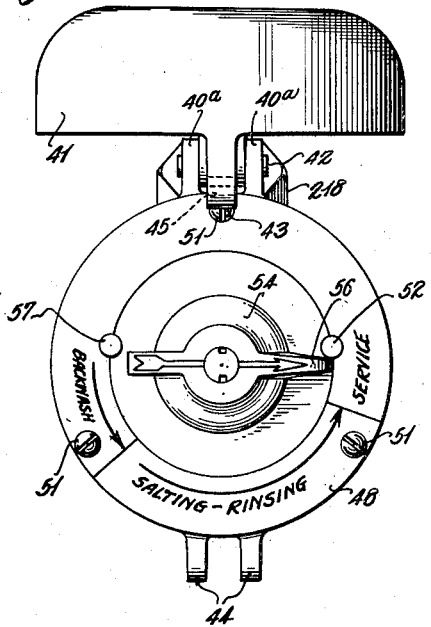
Fig. 12.
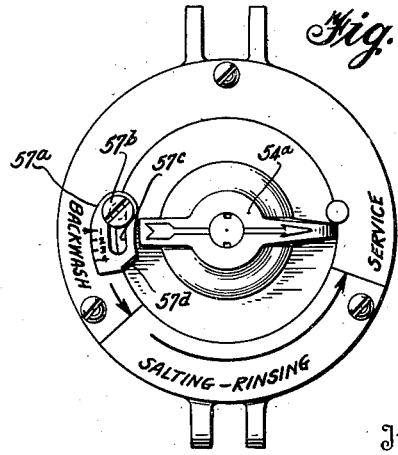
Fig. 12a.
Inventor
Donald G. Griswold
Attorneys

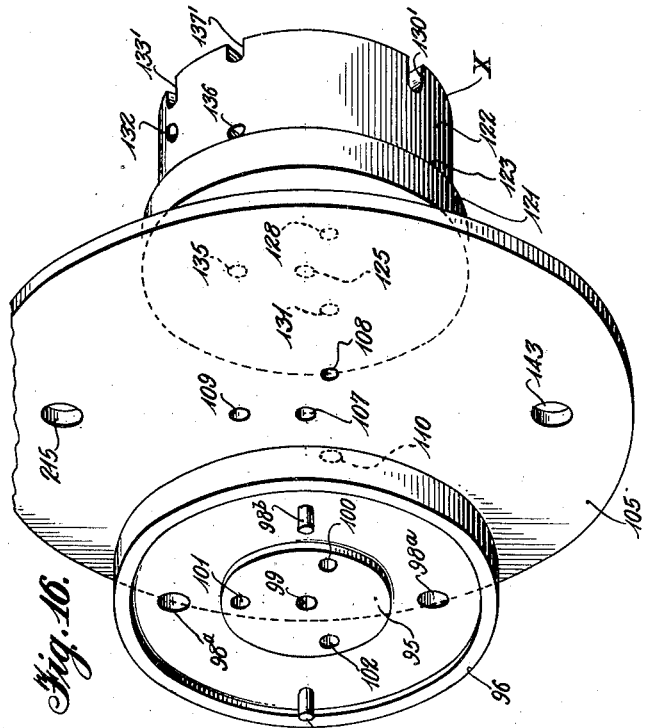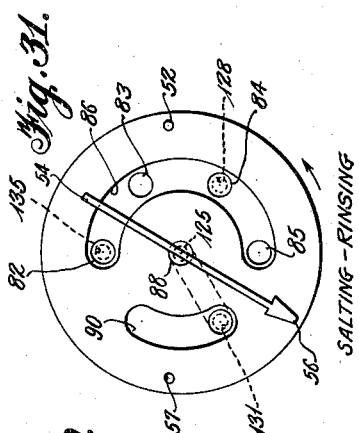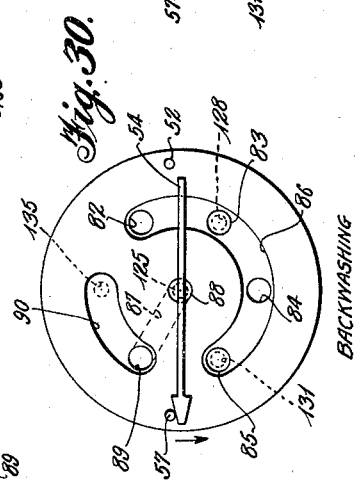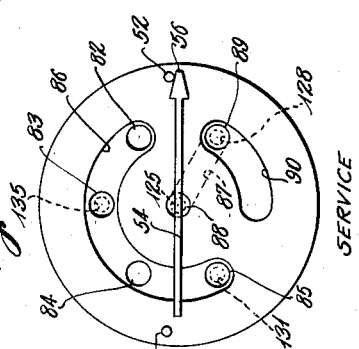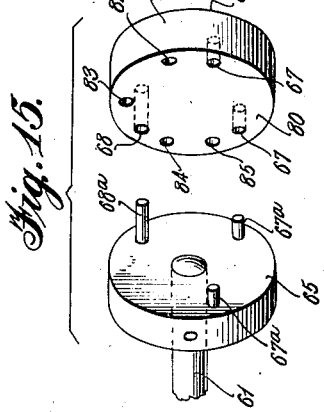
Inventor
Donald G. Griswold
By Bacon & Thomas
Attorneys May 27, 1941. D. G. GRISWOLD 2,243,815
WATER SOFTENING APPARATUS
Filed May 17, 1939 10 Sheets-Sheet 8
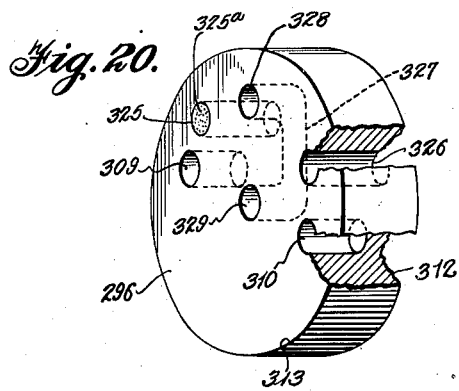
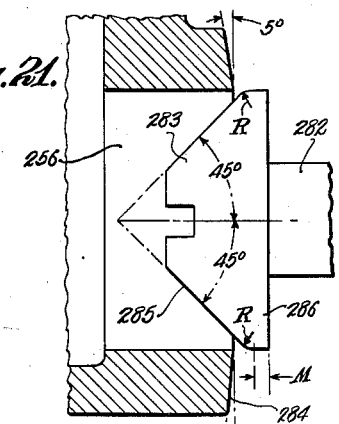
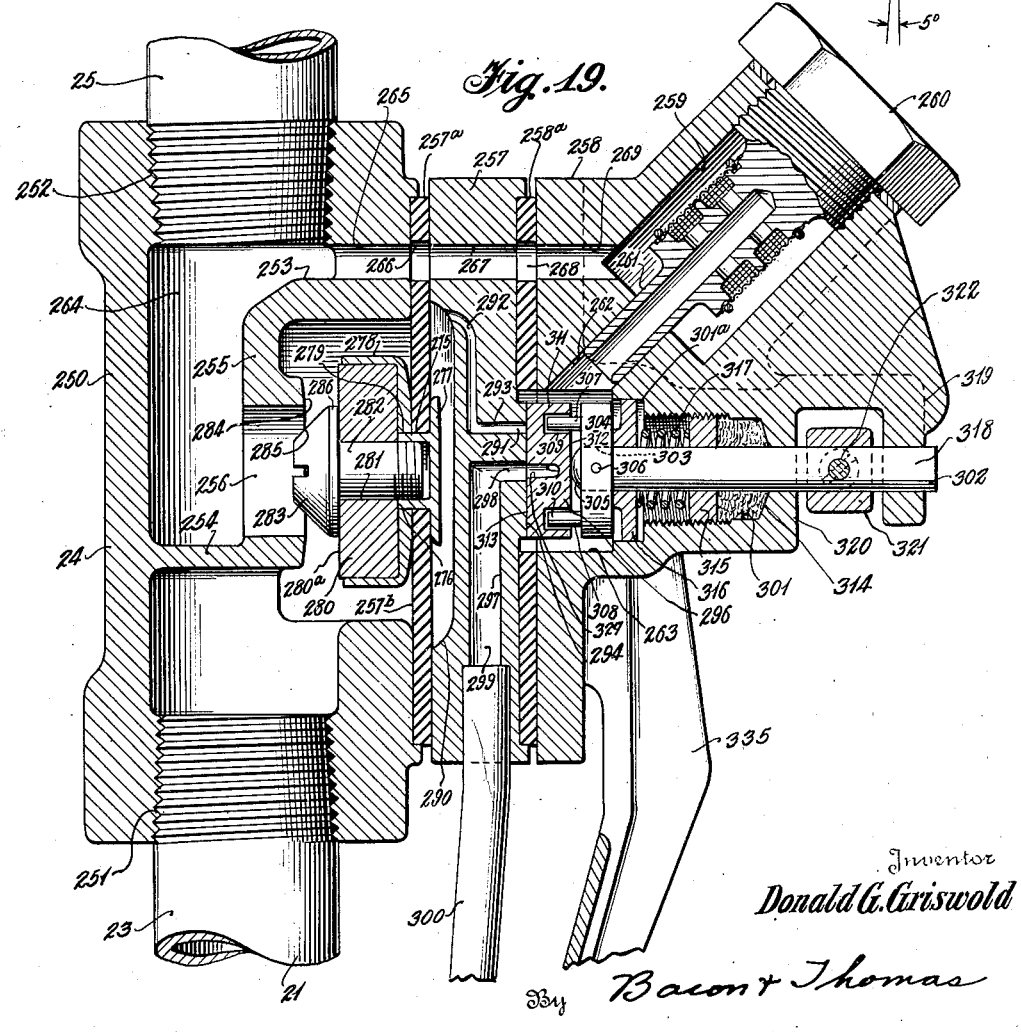
Inventor
Donald G. Griswold
By Bacon & Thomas
Attorneys

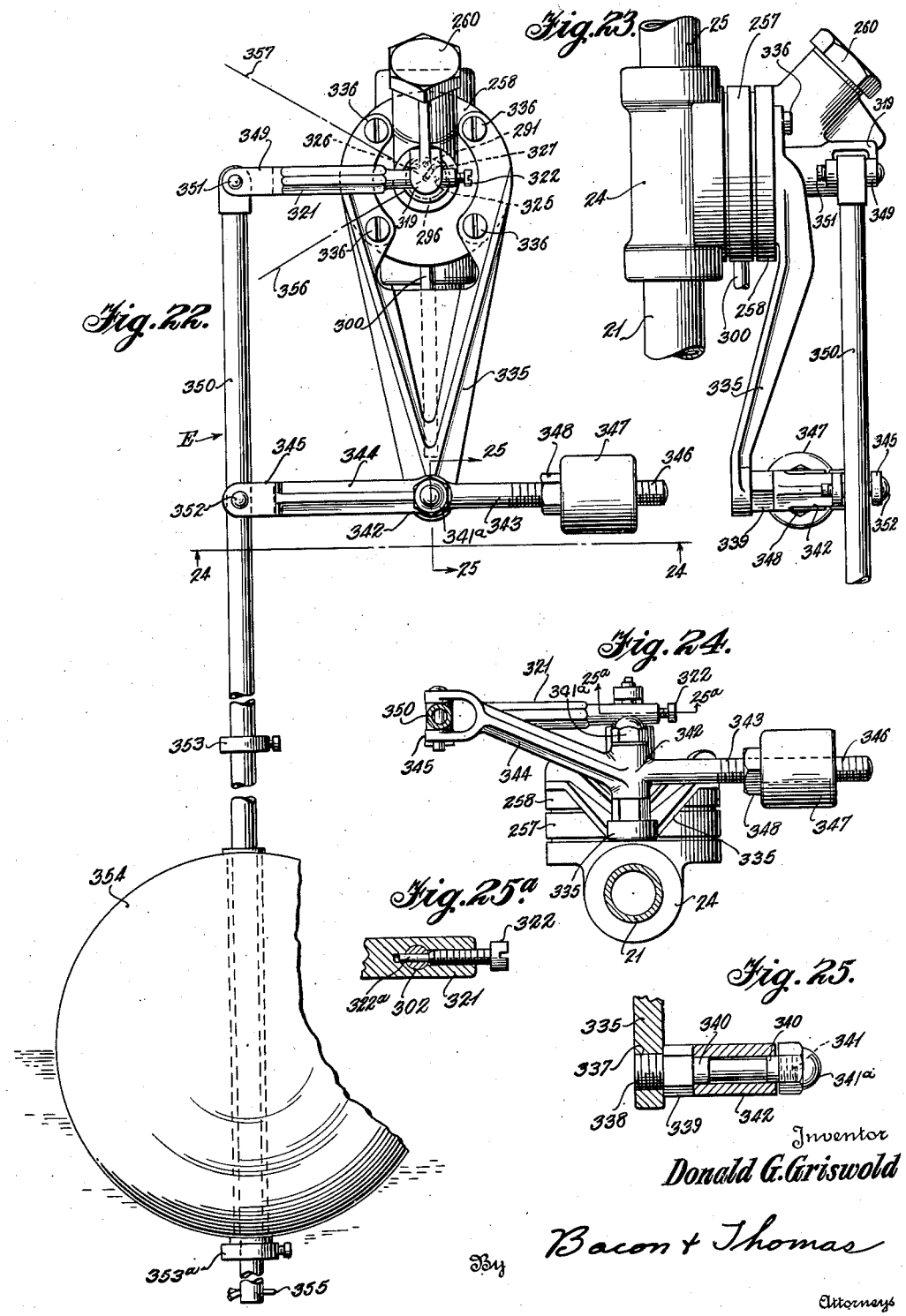

May 27, 1941.　　D. G. GRISWOLD　　2,243,815
WATER SOFTENING APPARATUS
Filed May 17, 1939　　10 Sheets-Sheet 10
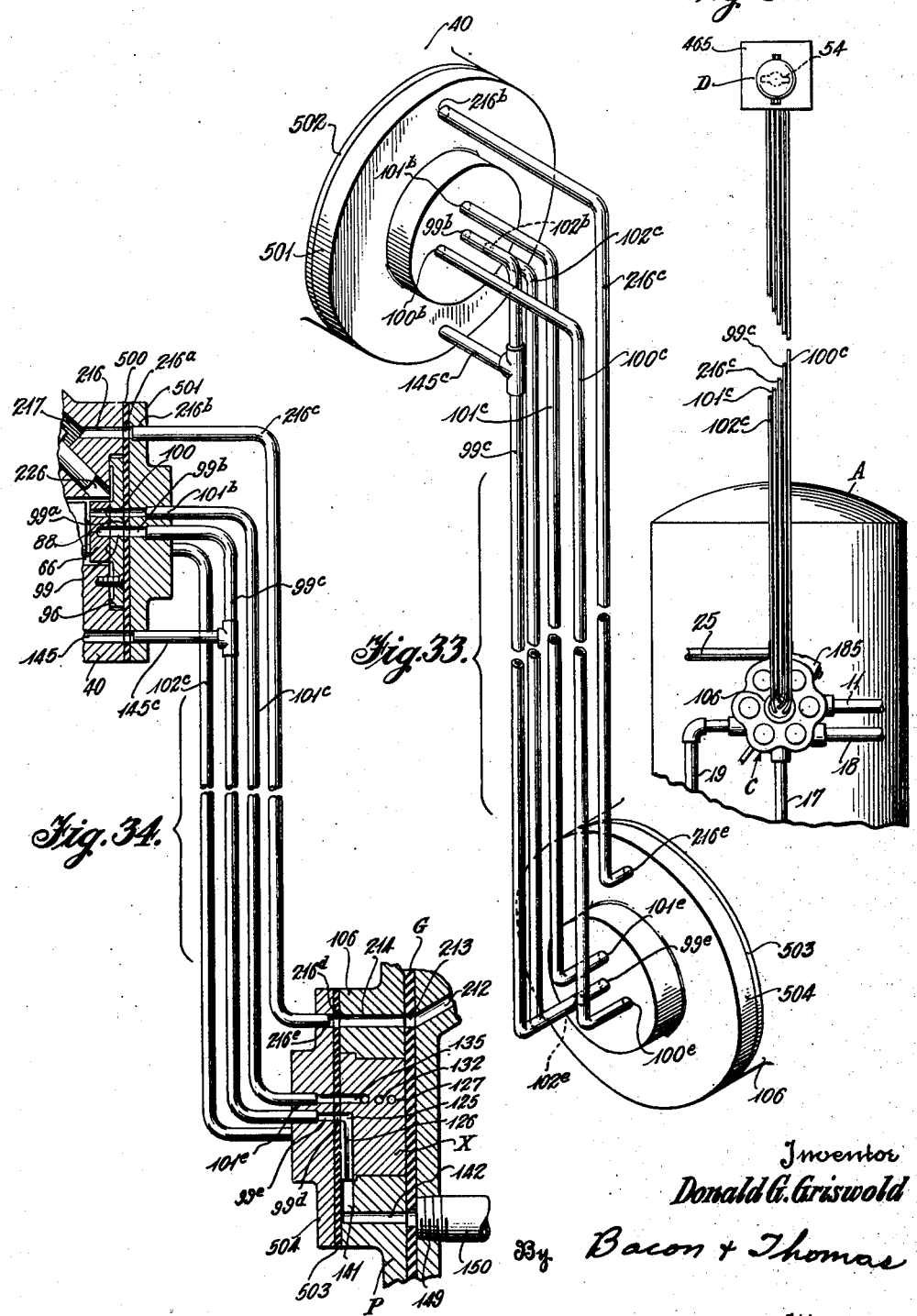
Inventor
Donald G. Griswold
By Bacon + Thomas
Attorneys Patented May 27, 1941

2,243,815

UNITED STATES PATENT OFFICE 2,243,815

WATER SOFTENING APPARATUS

Donald G. Griswold, Alhambra, Calif., assignor to Clayton Manufacturing Company, Alhambra, Calif.

Application May 17, 1939, Serial No. 274,288

33 Claims. (Cl. 210—24)

The present invention relates to water softeners, and especially to water softening systems or apparatus having control means for effecting regeneration of the system at the will and convenience of the user.

The invention further relates to a water softening system having control means located at a convenient point remote from the softening apparatus for initiating and effecting regeneration of the softener bed.

The invention still further relates to apparatus including a bed of material requiring periodic regeneration and to a novel means and method for effecting the regeneration of such bed.

In general, the invention relates to water softening systems of the type employing a bed of zeolite having the property of exchanging its normal sodium base for calcium and magnesium; the principal substances dissolved in water that impart hardness thereto.

In the normal operation of sodium zeolite water softeners, after a definite amount of raw water has passed through the bed, the sodium of the bed is replaced by the calcium and magnesium to such extent that the bed loses its softening property and the water passing therethrough is not softened thereby. Consequently, at certain time intervals, depending upon the nature and volume of water treated, it becomes necessary to recondition or regenerate the zeolite bed. In other words, it becomes necessary to replace the calcium and magnesium which the bed has absorbed from the raw water, by sodium. This is done by passing a strong brine (sodium chloride) solution through the bed. A reverse action then takes place in the bed, viz., the calcium and magnesium are exchanged for sodium and the bed is restored to its normal base condition.

The regeneration of water softeners, generally, is controlled either automatically or manually.

In the automatic type, regeneration of the softener bed usually starts after a predetermined number of gallons of water has passed through the softener tank. Such systems usually employ a water meter for measuring the volume of flow from the softener tank and necessarily include complicated and expensive control apparatus usually comprising one or more motors, switches, solenoid controlled valves, etc., to effect automatic operation. Probably the principal objection to known automatic water softening systems is that regeneration and consequent cutting-off of the supply of softened water occurs without warning; very often at an inopportune and inconvenient time, for example, when one is in the midst of a shower bath. Such automatic water softening systems are usually further unsatisfactory from a practical standpoint in that the water meters provided to initiate the cycle of regeneration eventually develop trouble and fail to function reliably and accurately. The lodgment of a particle of foreign matter beneath the disc of the water meter, or the warping of the disc itself, is sufficient to impair the accuracy of the meter with the consequent result that the softening bed is not regenerated at proper intervals and the system must be overhauled.

On the other hand, certain known water softening systems depending upon manual control for regeneration require the operator or user to open and close a series of hand-operated valves to control the various steps of backwashing, brine injection or salting, and rinsing; all necessary to proper regeneration of the softener bed. Furthermore, all of these steps must be separately timed in order to assure proper duration of the respective periods of backwashing, salting and rinsing. Such systems are very often complicated. Hence, it is not surprising that the wrong valves are opened and closed by an unskilled user, and that such systems have thus been rendered inoperative or reduced in efficiency. A great inconvenience, whether the user is skilled or unskilled, follows from the fact that his presence and attention are required at the side of the apparatus during the cycle of regeneration.

The present invention, in contrast, eliminates the usual complicated control gadgets of automatic water softeners and the complicated piping and hand-operated valves of manually controlled water softening systems and provides what may be termed a comparatively simple semi-automatic system in which regeneration occurs only at the will and convenience of the user. Stated broadly, the present invention is of such character that it is only necessary for the user to turn the control knob on a master control device a part of a revolution to immediately start the cycle of regeneration. One of the features of the invention is that the control device may be mounted adjacent the softener tank or at a convenient point remote therefrom. However, once the cycle of regeneration has been started, the steps of backwashing, salting, rinsing, etc., are automatically and successively rendered effective, and each step is automatically timed to last a predetermined period conducive to most efficient operation. In any event, the presence of the user is not required at the side of the apparatus during the cycle of regeneration.

Furthermore, in accordance with the present invention, the master control device includes a clock or timing mechanism of any suitable construction, but preferably of the type designed to rotate a drive shaft one complete revolution in a given period of time, for example, one hour. A control knob is associated with the drive shaft so that the two always rotate together. It is likewise preferable that the clock mechanism embody a spring which will be wound sufficiently by the turning of the control knob in a clockwise direction through approximately half a revolution to store sufficient energy for rotating the shaft of the clock mechanism in a counterclockwise direction for approximately one-half a revolution while simultaneously returning the control knob to its original position. The construction of the clock mechanism also preferably includes a friction device which makes it unnecessary for the escapement and reduction gears to turn when the control knob is rotated to wind the spring.

The master control device also includes a master pilot valve disc adapted to be driven by the shaft of the clock mechanism through approximately half a revolution. This master pilot valve disc is provided with pressure and exhaust grooves and pressure and exhaust ports arranged so as to admit water under pressure to, and relieve water pressure acting on, a series of pressure responsive diaphragm valves housed in a fluid distribution device or unit. It will be understood that upon rotation of the control knob corresponding rotation is imparted to the master pilot valve disc through the drive shaft of the clock mechanism.

The fluid distribution unit of the present invention is of extremely compact construction and comprises six diaphragm valves arranged to be operated in pairs and all controlled simultaneously by the master pilot valve to effect normal softening service and the successive steps of the regenerating cycle, to wit, backwashing, salting and rinsing. The fluid distribution unit further comprises a built-in injector actuable by the flow of water under the control of one of said diaphragm valves for drawing brine from a brine tank during the salting step.

When the present system is in normal service, that is, when the water softener is functioning to soften water, the control knob and master pilot valve disc are in what may be termed their normal inoperative position, but the master pilot valve disc at this time is in such position and cooperates with the fluid distribution device or unit in such manner that the fluid pressure on one pair of diaphragm valves only is relieved through the pilot valve, permitting this pair of valves to open and allow an uninterrupted flow of raw water through the distribution device. Suitable piping connects the distribution device with the softener, whereby raw water flows from the distribution device into the upper end of the softener, and softened water flows from the lower end of the softener back to the distribution device and, finally, from the distribution device into the service line to the point of use. It is to be understood that so long as the pressure is relieved on the pair of valves mentioned, the remaining four valves are subjected to fluid pressure and are maintained in closed position thereby.

After the system has been in operation for a period of, say, one to two weeks, and the indications are that it requires regeneration, the user need only turn the control knob through approximately half a revolution in a clockwise direction to initiate the cycle of regeneration. The rotation of the control knob rotates the master pilot valve disc and also winds the spring in the timing mechanism. The wound spring in turn stores the energy for rotating the drive shaft connected with the master pilot valve disc to impart rotation to said valve and return it slowly to its initial position. The rotation of the master pilot valve disc through a half revolution from its normal position results in the application of fluid pressure to close the above mentioned pair of diaphragm valves, which provide for normal softening operation, and to relieve the pressure on a second pair of diaphragm valves to permit the same to open. This second pair of valves is arranged in the distribution unit so as to cause the water to flow in a reverse direction therethrough to the water softener and provide a backwashing operation for flushing sediment, etc. out of the softener tank. During backwashing, the flow of water is from the distribution unit to the lower end of the softener tank, out of the upper end of the softener tank and back to the distribution unit, and finally, from the distribution unit into a drain. The above reverse circulation or backwashing operation continues for a period of time predetermined by the timing mechanism and the porting arrangement of the master pilot valve disc and may last anywhere from about five to ten minutes or more, as required by such factors as the pressure of the water, size of the softening bed, the amount of foreign matter or dirt left in the bed by the water which has been treated, etc. It will be understood that, while the second pair of diaphragm valves is open, the remaining four diaphragm valves are maintained in closed position by the application of fluid pressure thereto.

Upon completion of the backwashing step, the drive shaft of the timing mechanism will have rotated the master pilot valve disc to a position such as to relieve the pressure on, and thereby permit the opening of, still a third pair of diaphragm valves, while at the same time admitting fluid pressure to the first and second pairs of valves to maintain them in closed position. This third pair of valves is so arranged in the fluid distribution unit as to operate the injector housed in the fluid distribution unit and thereby control the salting step, i. e., the injection of the regenerating solution into the upper end of the softening tank. During the salting step, the flow of liquid through the distribution unit is as follows: water flowing into the distribution unit is diverted into the injector, the injector is thus operated to draw brine from the brine tank, and the brine entering the distribution unit is carried along with the water to the upper end of the softening tank. The brine flows through the zeolite bed in the softening tank; discharges at the lower end of the tank, is returned to the distribution unit and is discharged from the distribution unit through the same drain before-mentioned. After the charge of brine has been exhausted from the brine tank, raw water continues to flow through the system in the path described and serves to flush out the brine and any free material in the softener tank. The salting step may require from about three to ten minutes, depending upon the volume of the regenerating charge required, and the rinsing step may last for about fifteen minutes after the brine flow has ceased.

By the time that the salting and rinsing operations have been completed, the timing mechanism will have restored the master pilot valve disc to its original or normal position in which pressure fluid is relieved on the first-mentioned pair of valves, permitting these to open, and pressure fluid is applied to the second and third-mentioned pairs of valves to maintain them closed so that the system then assumes its normal function of softening water. The path of flow of water then is through the distribution valve to the upper end of the softener tank, through the softening bed, from the lower portion of the tank to the distribution device and then into the service line to the point of use, as aforedescribed.

One of the important features of the present softening system is a brine tank control mechanism cooperatively associated with the fluid distribution device to provide for draining of the brine tank during the salting step and for automatic refilling of the brine tank after completion of the rinsing step. The brine tank control mechanism includes a pilot-controlled diaphragm type brine valve which is unique in that it is responsive to both pressure and vacuum conditions and is arranged so that when the injector is in operation, the suction provided thereby will tend to induce a vacuum condition and thus reduce the pressure normally acting on the diaphragm to close the same. This reduced pressure on one side of the diaphragm permits opening of the valve by the brine itself which is under atmospheric pressure effective upon the other side of said diaphragm and the injector can then readily withdraw the charge of brine from the brine tank. This valve is further arranged so that it is closed by air under atmospheric pressure after a predetermined volume of brine has been withdrawn from the brine tank, by the injector. The same valve is later automatically reopened when the master pilot valve disc is restored to a position permitting normal softening operation. The drain from the distribution device is then closed so that a back pressure builds up in the softener tank and is communicated through the brine pipe to the valve seat side of the diaphragm. When this pressure exceeds atmospheric, the brine valve opens to permit refilling of the brine tank. The brine valve is again closed when the level has reached a predetermined desired height. A pilot valve disc in the brine valve controls the application of pressure to the diaphragm and hence the opening and closing of said valve. The brine pilot valve disc is actuated by a float in the brine tank.

One of the principal objects of the invention is to provide a water softening system which can be regenerated at the will and convenience of the user.

Another object of the invention is to provide a water softening apparatus which requires a minimum of attention on the part of the user.

Another object of the invention is to provide water softening apparatus which does not require the presence of the user at the side thereof during the cycle of regeneration.

Another object of the invention is to provide a water softening system which is semi-automatic in operation, that is, requires manual operation to initiate the regenerating cycle, but is otherwise fully automatic.

A further object of the invention is to provide water softening apparatus which is comparatively simple in construction and relatively inexpensive to manufacture.

Still another object of the invention is to provide a water softening apparatus which eliminates the inconveniences and the expense of maintenance encountered with more complex manual and fully automatic water softening systems.

Another object of the invention is to provide, in water softening apparatus, novel control means for automatically timing the various steps in the cycle of regeneration.

Another object of the invention is to provide quiet operating valve means broadly for controlling the flow of fluid, and which valve means eliminates line shock, chatter and vibration.

Another object of the invention is to provide valve means including a diaphragm for controlling the flow of fluid under pressure, and which valve means can be operated by a relatively small force irrespective of the size of the valve or the pressure of the fluid flowing therethrough.

Another object of the invention is to provide a fluid distribution device or unit which operates quietly without line shock, chatter or vibration.

Another object of the invention is to provide a fluid distribution device or unit and control means therefor which requires only a very small force to operate, irrespective of the pressure of the fluid flowing through said fluid distribution device or unit.

Still another object of the invention is to provide a fluid distribution device or unit of compact yet relatively simple construction for controlling the flow of water and brine to the softener tank.

Still another object of the invention is to provide, in water softening apparatus, an improved brine tank and control means therefor which automatically refills the brine tank and maintains a desired brine level in said tank.

A still further object of the invention is to provide control means for starting and controlling the cycle of regeneration of a water softening system from a point remote from the apparatus.

Other and further objects of the invention will be apparent from the following description taken in conjunction with the accompanying drawings, in which:

Figure 1 is a diagrammatic elevational view of a water softening apparatus embodying one form of the present invention and showing the brine tank in cross section;

Figure 2 is a sectional view taken on the line 2—2 of Figure 1;

Figure 3 is a sectional view through the master control device or unit and the fluid distribution device, taken on the line 3—3 of Figure 1;

Figure 6 is a sectional view taken on the line 6—6 of Figure 3 showing the body portion of the fluid distribution device in elevation;

Figure 4:
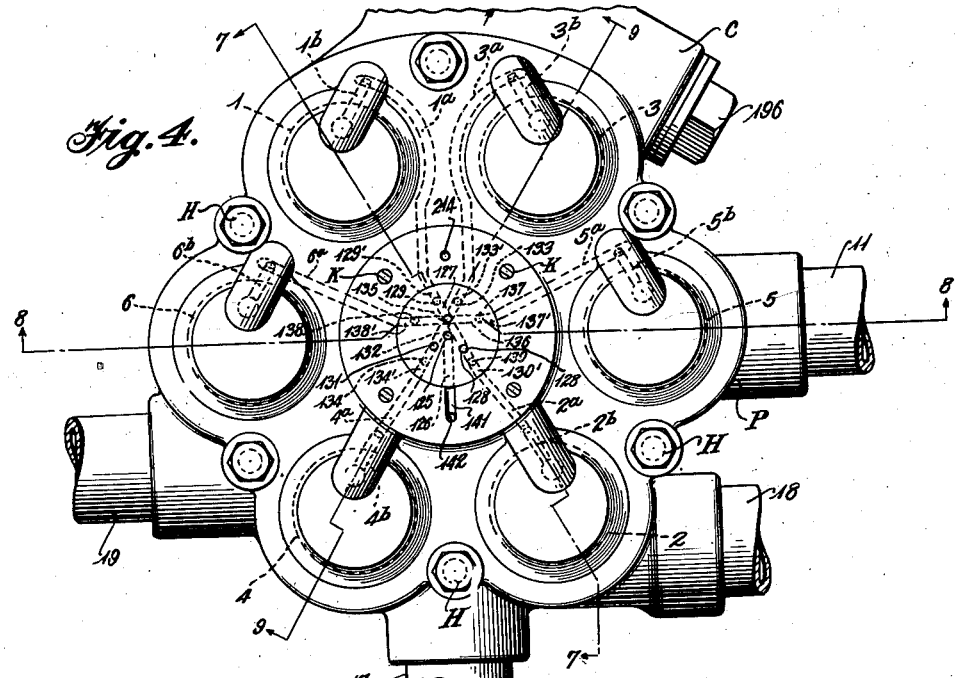
Figure 4 is a sectional view taken on the line 4—4 of Figure 3, showing an exterior view of the cover plate and various details of the fluid distribution device or unit.

Figure 7 is a sectional view through the fluid distribution device taken on the line 7—7 of Figure 4, showing the diaphragm valves 1 and 2, which control the flow of raw water to the softener during the normal softening operation, in open position;

Figure 8 is a similar sectional view taken on the line 8—8 of Figure 4, showing the diaphragm valves 5 and 6, which control the backwashing operation, in closed position;

Figure 9 is a further similar sectional view taken on the line 9—9 of Figure 4, showing the diaphragm valves 3 and 4, which control the salting and rinsing operations, in closed position;

Figure 10 is a transverse sectional view through the fluid distribution device, taken on the line 10—10 of Figure 9;

Figure 11 is a view of the combined gasket and diaphragm employed in the present fluid distribution device and showing certain parts of the valves 1, 2, 3, 4, 5 and 6 assembled therewith;

Figure 12 is a detail elevational view of the master control device showing the control knob and its associated legend bearing plate;

Figure 12a is an elevational view of a modified form of control including an adjustable stop for varying the duration of the "backwash" operation.

Figure 13 is a perspective view of one side of the pilot valve disc of the master control device;

Figure 14 is a sectional view through the master pilot valve disc taken on the line 14—14 of Figure 13;

Figure 15 is a perspective view of the opposite side of the master pilot valve disc and the means for rotating the same;

Figure 16 is a perspective view of the valve seat which cooperates with the master pilot valve disc, the gasket which is interposed between the end of the housing of the master control unit and the fluid distribution device, and the distribution plug of the fluid distribution device;

Figure 17 is a view of the outer face of the fluid distribution plug;

Figure 18 is an inverted plan view of the distribution plug as viewed in Figure 17;

Figure 19 is an enlarged longitudinal sectional view of the float-controlled brine control valve;

Figure 20 is a perspective view, partially in section, of the pilot valve disc employed in the brine control valve;

Figure 21 is a fragmentary view drawn to exaggerated scale showing specific details of the valve seat of the brine control valve and the head of the screw which retains the valve washer in assembled relation with the diaphragm;

Figure 22 is a detail view of the float and linkage for operating the brine control valve;

Figure 23 is a side elevation of the brine control valve and its operating linkage shown in Figure 22;

Figure 24 is a bottom plan view of the brine control valve and operating linkage taken on the line 24—24 of Figure 22;

Figure 25 is a sectional view taken on the line 25—25 of Figure 22 showing the mounting details of the lower arm of the brine valve operating linkage;

Figure 25a is a sectional view taken on the line 25a—25a of Figure 24 showing the details of mounting the actuating arm on the shaft which drives the brine pilot valve disc;

Figure 26 is a diagrammatic view illustrating the flow through the fluid distribution device during normal softening service;

Figure 27 is a similar view showing the flow during the backwash period;

Figure 28 is another similar view showing the flow during the salting and rinsing period;

Figure 29 is a schematic view illustrating the relative position of the control knob and the ports and grooves in the master pilot valve disc and the distribution plug, respectively, during normal softening service;

Figure 30 is a similar view showing the relationship of the same parts during backwashing;

Figure 31 is another similar view showing the relative positions of the parts during the salting and rinsing period;

Figure 32 diagrammatically illustrates a still further modification of the invention in which the master control unit is located at a point remote from the softening apparatus;

Figure 33 is a diagrammatic perspective view illustrating the manner in which pressure and exhaust fluid may be conducted from the master control unit or device to the fluid distribution device; and Figure 34 is a diagrammatic view partly in section showing the details of connecting various ports in the master control device with corresponding ports in the fluid distribution device.

Referring now to the form of the invention shown in Figures 1 to 31, inclusive, and more particularly to Figure 1, the water softener is generally designated by the letter A, the brine tank by B, the fluid distribution device or unit by C, the manually operable master control device for starting the regenerating cycle by D, and the float-controlled valve and its associated linkage on the brine tank by E.

Raw water, i. e., the water to be treated, is introduced into the system through a supply pipe 11 connected to one side of the fluid distribution device C. The raw water introduced by the supply pipe 11 flows through various passageways in the fluid distribution device C, as will be explained later, and is then conducted from said distribution device to the softener A by piping generally indicated at 13. As is clearly shown in Figure 2, the piping 13 extends into a softener tank 14 and is preferably arranged so that the discharge therefrom is upward toward the inside of the tank head 15.

The tank 14 of the softener A contains a bed 16 of zeolite (or other water softening material). Discharge piping 17 is arranged adjacent the bottom of the tank 14 and conducts the water that has passed through the bed 16 back to the distribution device C. A portion of the pipe 17 lies within the tank 14 and is provided with a series of downwardly facing slots 17a. The softened water enters the distribution device through the piping 17 and passes therethrough in a manner which will also be explained hereinafter and ultimately discharges into a service pipe 18.

The brine tank B contains a bed of salt 20 and the usual layer of coarse gravel 20a. A pipe 21 extends through the salt bed 20, as shown in Figure 1, and one end 22 thereof is perforated and projects into the layer of gravel 20a. The opposite end 23 of the piping 21 is connected to a float controlled diaphragm valve generally indicated by the numeral 24. A pipe 25 connects the diaphragm valve 24 with the distribution device C. The valve 24 is only generally referred to at this point, and the details thereof will be described later. Likewise, the manner of flow of brine from the tank B to the softener A through the distribution device C under control of the valve 24 and mechanism E will be explained later.

The master control device D is best illustrated in Figure 3, and comprises a main housing 40 and a hinged cap 41 pivotally mounted at one side thereof upon the housing between ears 40a by a pin 42. The opposite side of the cap 41 is provided with a projecting tongue 43 which extends between a pair of lugs 44 depending from the housing 40. The tongue 43 is provided with an aperture 45 located so that it extends inwardly beyond the lugs 44 when the cap is in closed position. The aperture 45 is thus adapted to receive a pin, lock or other means for maintaining the cap in closed position.

A clock mechanism generally designated 46 is mounted within the main housing 40 and is disposed between a shoulder 47 and a cover plate 48. A gasket 49 is interposed between the cover plate 48 and a flange 50 of the main housing 40. A series of screws 51 retain the cover plate 48, gasket 49 and clock mechanism 46 in assembled relation with the housing 40.

A stop pin 52 is mounted in the cover plate 48 and projects through the top plate of the clock mechanism 46, whereby rotation of the clock mechanism 46 relative to the cover plate 48 is prevented.

A control knob 54 is operatively associated with a drive shaft 55 of the clock mechanism and one end 56 of said control knob is adapted to engage the stop pin 52 in the normal inoperative position thereof (see Figures 3 and 12).

The clock mechanism 46 is conventional, and therefore need not be described in detail. It will be understood from prior statements made herein that the spring of the clock mechanism is wound by manually turning the control knob 54 clockwise for about half a revolution or until the end 56 of said control knob engages a second stop member 57. Upon release of the control knob 54, the spring will cause the control knob 54 to slowly return to its initial position; the time required being about thirty minutes. For convenience, the face of the cover plate 48 may be inscribed with suitable indicia to indicate the various functions controlled by the master valve. For example, the cover plate shown herein bears the legend "Service" adjacent the stop pin 52 (see Figure 12) to indicate the normal inoperative position of the control knob 54. The cover plate 48 further bears the legend "Backwash" adjacent the second stop pin 57, which operation occurs when the knob 54 is turned clockwise so that its end 56 is brought into engagement with said stop pin 57. Intermediate the service and backwash legends is a third legend, namely, "Salting-rinsing," and when the end 56 of the control knob 54 is traversing this portion of the cover plate, it indicates the fact that the water softening apparatus is undergoing the operation of salting and the subsequent step of rinsing.

A driving element 60 (see Figure 3) is driven by the drive shaft 55 of the clock mechanism 46 and it in turn drives a shaft 61 through a driven element 62 suitably secured to one end of the shaft 61. The driven element 62 is provided with apertures 63 adapted to receive pins 64 carried by the driving member 60. The opposite end of the shaft 61 is rounded as shown at 61a and is provided with a driving element 65. A master pilot valve disc 66 is arranged in substantially axial alignment with the shaft 61 and is provided, as best shown in Figure 15, with a pair of apertures 67 adapted to receive short pins 67a carried by the driving element 65 and a through aperture 68 adapted to receive a long pin 68a. This arrangement has the advantage that it permits the assembly of the parts in only one way. The apertures 67 and 68 are of greater diameter than the pins 67a and 68a to permit slight relative movement of the disc on the pins. It will, therefore, be apparent from the foregoing that as the drive shaft 55 of the clock mechanism drives the driving element 60, rotation is imparted to the pilot valve disc 66 through the driven element 62, shaft 61, and driving element 65.

The shaft 61 (see Figure 3) is packed in the housing 40 by suitable packings 69 and 70. The packing 69 surrounds the shaft 61 and is engaged by a packing washer 71 which in turn is engaged by a gland 72 threaded into the housing 40 adjacent the driven element 62. Adjustment of the gland 72 against the washer 71 compresses the packing 69 to the extent desired to form a suitable seal around the shaft 61. The packing 70 likewise surrounds the shaft 61 and is compressed between packing washers 73 and 74 by a gland member 75 threaded into the housing 40.

A compression spring 76 surrounds the shaft 61 and one end thereof engages the gland 75. The opposite end of said spring engages a seating washer 77 carried by the shaft 61. The washer 77 is arranged to abut the driving element 65, and, inasmuch as the spring 76 is a compression spring, it tends to urge the driving member 65 toward the pilot valve 66. The spring 76 urges the rounded end 61a of the shaft against the valve disc 66 to hold the same against its seat at all times, as will appear more fully hereinafter.

The master pilot valve disc 66 has opposite flat faces 80 and 81 (see Figures 13, 14 and 15). A plurality of supply ports 82, 83, 84 and 85 extend transversely through the body of the pilot valve and are connected on the side 81 by a pressure fluid supply groove generally indicated by the numeral 86. In some instances it may be desirable to omit ports 83 and 84, inasmuch as the ports 82 and 85 will supply the necessary pressure fluid to the groove 86.

The master pilot valve disc 66 is also provided with a U-shaped exhaust passageway 87 (see Figure 14). One leg 88 of the U-port 87 is arranged axially of the pilot valve disc and opens into the side 81 thereof. The other leg 89 of said U-shaped exhaust passageway is spaced radially from the axial passageway 88 and also opens onto the side 81 of said pilot valve disc. An arcuate drain groove 90 merges with the opening defined by the leg 89 and extends circumferentially in the side 81. It will be noted that the supply groove 86 and the drain groove 90 are formed concentric with the axial opening 88 and that the supply ports 82, 83, 84, 85, the exhaust port 89 and the terminal of the drain groove 90 are spaced approximately 60° apart. This spacing, however, is not critical and may be varied as desired, within limits of course.

The side 81 of the pilot valve 66 is adapted to seat against a flat surface 95 of a valve seat 96 (see Figure 3). The valve seat 96 is received in a recess 97 formed in one end of the housing 40. The valve seat 95 is secured to the housing 40 by a pair of screws 98 adapted to extend through openings 98a (see Figure 16). The valve seat 95 is provided with an axial port 99 adapted to register with the axial opening 88 in the pilot valve disc 66. The valve seat 95 is also provided with a series of transverse openings 100, 101 and 102, respectively, which are spaced the same distance from the axis of the valve seat 95 as the supply and drain grooves 86 and 90 of the pilot valve. A pair of dowel pins 98b are provided to assure accurate assembly of the seat with the housing.

A gasket 105 (see Figures 3, 7 and 16) is interposed between the end of the housing 40 and a boss 106 formed on the cover plate P of the fluid distribution device C. A plurality of screws K clamp said gasket between the housing 40 and the boss 106, as shown in Figure 7. The gasket 105 is provided with an axial opening 107 aligned with the opening 99 in the valve seat 95 and the opening 88 in the valve disc 66. The gasket 105 is also provided with transverse openings 108, 109 and 110 adapted to respectively register with the transverse openings 100, 101 and 102 in the valve seat 95. Thus, it will be clear that the aligned openings in the valve seat 95 and the gasket 105 permit flow of supply or exhaust fluid through both of these elements simultaneously.

The fluid distribution unit or device C comprises a body F, a cover plate P and a combined gasket and diaphragm G interposed between said body and cover plate. The diaphragm is clamped between the body F and cover plate P in fluid tight relation by a series of bolts H which extend through the cover plate and gasket into the body of the distribution valve, as best illustrated in Figure 3.

The housing F of the distribution device C contains six diaphragm valves 1, 2, 3, 4, 5 and 6, respectively. These valves are indicated by dotted lines in Figure 4 and by dot-and-dash lines in Figures 6 and 10, respectively. All six valves are of identical construction, and it will suffice for the purpose of the present disclosure to describe only one in detail. For this purpose it will be convenient to refer to Figure 7 which shows the valves in cross section.

Each of the valves 1, 2, 3, 4, 5 and 6 consists of a guide member 111 having a plurality of legs 112 circumferentially spaced from each other. An annular packing washer 113 engages one side of the guide member 111 and is received in a cup 114. The upper external surface of the cup 114 is preferably made convex, as indicated at 115. The cup 114, washer 113 and the guide 111 are maintained in assembled relation by a bolt 116 having an enlarged head 116a. The bolt 116 has a threaded shank 117 received in a threaded opening 118 in the guide member 111. A diaphragm member G is clamped between the convex side 115 of the cup 114 and the underside of the head 116a. In this manner, the valve is maintained in assembled relation with the diaphragm. It will be understood that while a single large diaphragm has been shown herein common to all the valves, a plurality of diaphragms may be used, if desired, that is, one diaphragm for each valve. The diaphragm G and washer 113 may be compressed to the extent desired by threading the guide 111 onto the shank 117 of the bolt 116. A prick punch may be used to peen a portion of the thread of the shank onto the underside of the guide to prevent inadvertent disassembly.

Fluid under pressure for operating the valves 1, 2, 3, 4, 5 and 6 is supplied by the master pilot valve 66 to a fluid distribution plug X (see Figure 3). The plug X is preferably shrunk or press-fitted into a recess 120 in the boss 106 formed on the cover plate P of the fluid distribution device C. The plug X is shown in detail in Figures 16, 17 and 18, and comprises an outer cylindrical portion 121 and an inner cylindrical portion 122 of reduced diameter, whereby a shoulder 123 is formed between the portions 121 and 122. The shoulder 123 is adapted to engage a complementary shoulder 124 formed in the recess 120. The plug X may be inserted into the cover plate P in any desired manner so long as a fluid-tight fit is formed between the outer periphery of said plug and the walls of the recess 120.

The plug X is provided with an axial opening 125 which communicates with a radial exhaust passage 126 extending through the annular portion 121 of the plug X. The axial opening 125 and the radial passage 126 serve as conduits permitting exhausting of pressure fluid from the distribution device C in a manner which will be explained hereinafter.

The fluid distribution plug X is also provided with a transverse passageway 127 which communicates with a longitudinal port 128 and longitudinal passageways 129 and 130. The port 128, the transverse passageway 127 and the longitudinal passageways 129 and 130 serve to supply and exhaust pressure fluid from a pair of diaphragm valves 1 and 2 providing normal softening operation in a manner which will be fully set out hereinafter.

The plug X is further provided with a second longitudinal port 131, a transverse passageway 132 and longitudinal passageways 133 and 134. These ports and passageways serve to supply and exhaust pressure fluid from another pair of diaphragm valves 3 and 4 providing the salting and rinsing in a manner which will be made apparent hereinafter.

The plug X is still further provided with a third longitudinal port 135, a transverse passageway 136 and longitudinal ports 137 and 138. These passageways and ports serve to supply and exhaust pressure fluid from still another pair of diaphragm valves 5 and 6 providing backwash in a manner which will also be made apparent hereinafter.

It will be noted from Figure 16 that the ports 128, 131, and 135 in the plug X are aligned with ports 100, 102, and 101, respectively, of the valve seat 95. It will also be understood that the outer end of the radial exhaust passageway 126 and the respective ends of the transverse passageways 127, 132 and 136 are closed by the walls of the recess 120.

The plug X is proportioned so that its inner face 139 is substantially flush with the inner face of the cover plate P and its outer face 140 is substantially flush with the surface of the boss 106, as is also clearly shown in Figure 3.

The axial port 125 extends inwardly from the face 140 and communicates with the exhaust passage 126 in order that spent pressure fluid may be conducted from the axial center of the plug outwardly to its periphery. In order to facilitate the discharge of fluid from the passageway 126, the boss 106 is provided with an aligned passageway 141 (see Figure 3). The passageway 141 in turn communicates with a transverse passageway 142 in the cover plate P. The gasket 105 is provided with an opening 143 aligned with the transverse passageway 142 and the combined gasket and diaphragm G is provided with a similar opening 144. The housing 40 is provided with a passageway 145 aligned with the passageway 142 and is further provided with a radial passageway 146 intersecting with the passageway 145 at the point 147. A screw 148 is threaded into the outer end of the passageway to plug the same.

The body F of distribution device C is provided with a threaded opening 149 (see Figure 3) communicating with the passageways 142, 143, 144 and 145, and a drain pipe 150 is threaded into the opening 149, whereby any fluid which has leaked past the packing 70 will be free to drain from the control unit C.

Figure 5:
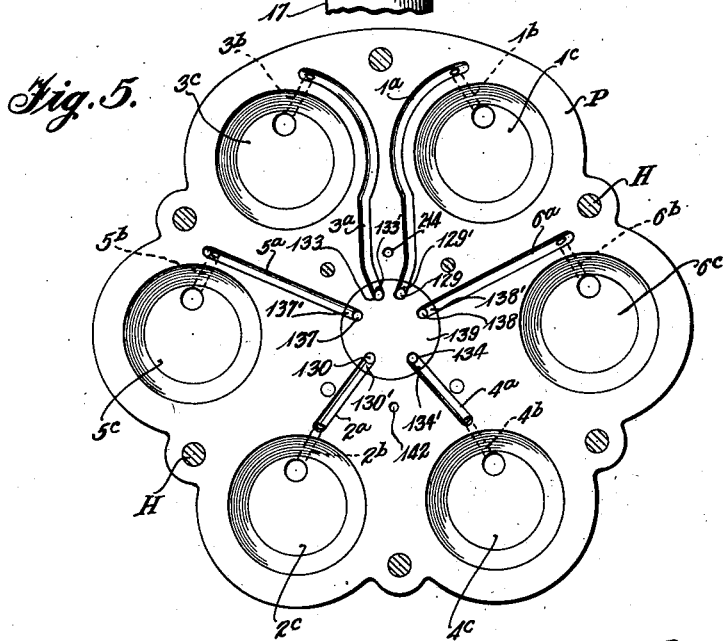
Figure 5 is a sectional view taken on the line 5—5 of Figure 3 showing the details of the grooving and porting in the underside of the cover plate of the fluid distribution device or unit.

Referring to Figure 5, the inner face 139 of the plug X is provided with a series of relatively shallow grooves communicating with a series of cooperating grooves formed in the inner face of the cover plate P of the fluid distribution device whereby fluid may be introduced into or exhausted from the pressure chambers of the diaphragm valves 1 to 6 inclusive. More specifically, the plug X is provided with a shallow groove 129' extending from the longitudinal passageway 129 outwardly to the periphery of the plug. The inner face of the cover plate P is provided with an irregular shaped groove 1a which is in communication at one end thereof with the shallow groove 129'. A passageway 1b connects the opposite end of the groove 1a with a pressure chamber 1c above the diaphragm valve 1.

The inner face 139 of the fluid distribution plug X is also provided with a second shallow groove 130' which extends from the longitudinal passageway 130 outwardly to the periphery of the plug X. One end of the groove 2a formed in the inner face of the cover plate P communicates with the shallow groove 130', and a passageway 2b connects the opposite end of said groove with a pressure chamber 2c positioned above the diaphragm valve 2.

The plug X is further provided with a shallow groove 133' which extends from the longitudinal passageway 133 outwardly to the periphery of the plug X. A groove 3a formed in the inner face of the cover plate P is connected at one end with the shallow groove 133' and its opposite end is connected by a passageway 3b with a pressure chamber 3c located above the diaphragm valve 3.

The plug X is still further provided on its inner face with a shallow groove 134' extending from the longitudinal passageway 134 outwardly to the periphery of said plug. The inner face of the cover plate P is provided with still another groove 4a connected at one end with the shallow groove 134' and connected at its other end by a passageway 4b with a pressure chamber 4c above the diaphragm valve 4.

The inner face 139 of the plug X has another shallow groove 137' extending outwardly from the longitudinal passageway 137 to the periphery of the plug X. A groove 5a formed in the inner face of the cover plate P is connected at one end with said shallow groove 137' and its opposite end is connected by a passageway 5b with a pressure chamber 5c above the diaphragm valve 5.

The inner face 139 of the plug X is provided with still another shallow groove 138' extending outwardly from the longitudinal passageway 138. A groove 6a formed in the inner face of the cover plate P is connected at one end with said shallow groove 138' and its opposite end is connected by a passageway 6b with a pressure chamber 6c above the diaphragm valve 6.

The various passageways, valve seats, etc. in the body F of the fluid distribution device C are about to be described and it will therefore be convenient to refer to Figures 5 to 10.

As has been stated hereinbefore, raw water is introduced into the distribution device C through the supply pipe 11. This water flows from the pipe 11 into a passageway 160 defined by walls 161 arranged below the seats 5s, 3s and 1s for the valves 5, 3 and 1, respectively. This passageway terminates beneath valve seat 1s at the partition indicated by 162 (Figure 10).

The raw water normally discharges from the distribution device through the pipe 13. This pipe communicates with a passageway 163 shown adjacent to the passageway 160. However, the passageway 163 is separated from the passageway 160 by the wall 161 and the partition 162. The passageway 163 is defined by walls 164 and terminates at the partition 165 below the seat 6s of the diaphragm valve 6 (see Figure 10).

The return of water to the distribution device C from the water softener normally takes place through the pipe 17 already referred to. Water entering the distribution device from the pipe 17 discharges into a passageway 166 defined by walls 167 and extending beneath the seats 2s and 4s of the valves 2 and 4, respectively. The passageway 166 terminates at one end in a partition 168 (see Figure 10) disposed below the seat 4s of diaphragm valve 4, and terminates at its opposite end in a partition 169 adjacent the valve seat 5s of the diaphragm valve 5. Thus, the passageways 160 and 166 are separated by the partition 169 formed by adjacent portions of walls 161 and 167.

Referring to Figures 6, 7 and 10, and especially to Figure 7, the distribution device C is provided with an opening 175 between the seat 1s of the valve 1 and an inwardly extending flange 176 on the body F disposed adjacent to the gasket G. Hence, when valve 1 is open and valves 5, 3, and 6 are closed, raw water will flow through the passageway 160, through the seat 1s and opening 175 into the passageway 163, and thence into the pipe 13 leading to the softener tank 14. An opening similar to the opening 175 is provided above the seat 2s of valve 2. This opening is indicated at 177 and communicates with a chamber 178 (see Figure 10) adjacent the opening for the service pipe 18. The valve 2 is open at the same time as valve 1, (as shown in Figure 7), and the softened water entering the distribution valve through the pipe 17 then flows into the passageway 166, through the valve seat 2s, opening 177 into chamber 178, and thence through service pipe 18 to the point of use. The flow of water through the distribution device when valves 1 and 2 are open and valves 3, 4, 5 and 6 are closed is diagrammatically shown in Figure 26. The criss-cross hatching here indicates the valves that are closed during normal softening operation.

During the backwashing step, valves 5 and 6 are open and valves 1, 2, 3 and 4 are all closed, as is diagrammatically shown in Figure 27. The flow of raw water to the softener is reversed at this time in order that the water will flow upwardly through the bed in the softener tank and flush it out. Accordingly, raw water introduced through the pipe 11 enters the passageway 160, but since valves 1 and 3 are closed and valve 5 is open, the water must leave through the seat 5s of the valve 5. In order to provide egress for the water to pipe 17, an opening 179 somewhat similar to the opening 175 is provided immediately above the partition 169, or in other words, above the seat 5ˢ of the valve 5. Water then flows through the opening 179 into the passageway 166, beneath valve 2 and into pipe 17. Water is discharged from the pipe 17 through the slots 17ᵃ at the lower portion of the softener tank 14. The water then flows upwardly through the softener bed 16 and out of the tank through the pipe 13. The pipe 13 discharges into the passageway 163 which, as has been previously described, extends to a point beneath the valve 6. The valve 6, as has also been stated, is open during the backwash period, therefore water from the passageway 163 passes through the seat 6ˢ of the valve 6. An opening 180 similar to the opening 179 is provided above the seat 6ˢ and above the partition 165 to permit flow into a chamber 181. The chamber 181 lies between the partitions 165 and 168. Water entering this chamber is required to leave the distribution device through the drain pipe 19.

In order to introduce brine into the system to regenerate the softening bed 16, the distribution device C is provided with an injector generally designated by the numeral 185 (see Figure 10) mounted in a housing 186 formed integral with the body F. The injector comprises a nozzle 187 threadedly mounted in an opening 188 in the housing 186. The nozzle 187 is provided with a tapered orifice 189 arranged so that its smaller end discharges into a chamber 190. The opposite or larger end of said orifice communicates with a chamber 191. The chamber 191 in turn is associated with an opening 192 in the body F (see Figure 9) arranged above the seat 3ˢ of the valve 3. Thus, it will be apparent that when the valve 3 is open and valves 1 and 5 are closed, raw water from the passage 160 will flow through the seat 3ˢ of the valve 3, through the opening 192, and into the chamber 191.

A screen 193 (Figure 10) is arranged in the chamber 191 substantially concentric with the nozzle 187. One end of the screen is suitably secured to a boss 194 formed on the nozzle 187 and the opposite end of the screen is received in a recess 195 formed in a plug 196. The plug 196 is threaded into an opening 197 formed in the housing 186. A gasket 198 is disposed between the housing 186 and the plug 196 to form a seal.

The injector 185 further includes a second nozzle 200 threadedly mounted in an opening 201 formed in a partition 202 located between the chamber 190 and the passageway 163. The nozzle 200 is provided with an orifice 203 which may be of uniform diameter and arranged in alignment with the tapered orifice 189 of the nozzle 187.

In assembling the injector in the housing 186, it will be understood that the nozzle 200 is first threaded into the opening 201 by means of a suitable wrench, and that the nozzle 187 is similarly mounted. The screen 193 is preferably preassembled with the plug 196 and the gasket 198 is positioned on the plug 196. The plug is then threaded into the opening 197. This arrangement facilitates assembly and provides for ready removal of the screen for cleaning.

The chamber 190, which is disposed between the nozzles 187 and 200, is provided with an inlet opening 26 into which the brine pipe 25 is threaded.

During the period of regeneration when brine is being circulated through the softener tank 14, the valves 3 and 4 are open and the valves 1, 2, 5 and 6 are all closed, as is diagrammatically shown in Figure 28. Raw water supplied by the pipe 11 then enters the passageway 160 and flows through the seat 3ˢ of open valve 3, through opening 192, into chamber 191, through tapered orifice 189, into chamber 190 and then through the plain orifice 203. The effect of this flow is to create a partial vacuum in the chamber 190 and pipe 25. The vacuum thus induced creates a suction permitting opening of the brine control valve 24 in a manner which will be better understood from a description of said valve appearing hereinafter. Upon opening of the valve 24, the injector draws the brine charge from the brine tank B and both brine and raw water are discharged from the nozzle 200 into the passageway 163. The mixture is then conducted by the pipe 13 into the top of the softener tank 14 so that reaction with and regeneration of the bed 16 occurs by the down-flow of the brine therethrough. The used brine is discharged from the softener tank 14 into the pipe 17 which returns it to the distribution device for flow into the chamber 166. An opening 210 above the partition 168 similar to the opening 180 is provided in the body F, whereby the brine can flow from the passage 166, through the seat 4ˢ of the valve 4, into the passageway 181 and finally into the drain pipe 19. It will be understood that the valve 2 is closed during the brining operation and that, therefore, no brine can flow from the passage 166 into the chamber 178 and the service pipe 18.

Flow in the above manner is maintained until the complete charge of brine has been withdrawn from the brine tank B and circulated through the system, whereupon the brine flow will cease, but raw water will continue to flow through the system to flush out the softener tank, all as will be further explained later.

The body F of the fluid distribution device C is provided with a rib 211 disposed generally between the valves 1 and 3, as indicated in Figures 3 and 10. A passageway 212 is drilled or otherwise formed in the rib 211 to establish communication between the passageway 160 and the front wall of the distribution device C. Inasmuch as the passageway 160 is always under line pressure, a corresponding pressure will obviously exist in the passageway 212.

Referring to Figure 3, it will be seen that the gasket G is provided with an opening 213 in registration with one end of the passageway 212, and further, that the boss 106 of the cover plate P is provided with a horizontal passageway 214. The gasket 105 is provided with a passageway 215 and the housing 40 is provided with a passageway 216; the passageways 212, 213, 214, 215 and 216 all being in communication, whereby fluid under pressure from passageway 160 may enter a chamber 217 formed in said housing. A strainer plug 218 is threaded into the chamber 217 as indicated at 219. A gasket 218ᵃ is positioned below the head of the plug to form a water-tight seal.

The strainer plug 218 comprises a hollow stem 218ᵇ having a series of spaced apart annular flanges 220, 221 and 222 with openings 223 between the flanges communicating with a central opening 224 in the stem. A screen 225 surrounds the flanges 220, 221 and 222 and serves to screen the openings 223. Thus, pressure fluid must pass through the screen 225 before it can leave the chamber 217 and enter the hollow stem 218ᵇ. It will be noted at this point that the lower portion of the stem beyond the flange 222 is of greater axial length than the threaded portion 219 of the plug and extends into an opening 226 in the housing 40. Thus, the opening 226 will be obstructed by the extremity of the stem 218ᵇ until after the threaded portion 219 has been completely backed out of its opening; the object of this arrangement is to permit any water contained in, or flowing into, the chamber 217 to flush foreign matter out of said chamber during the removal of the plug rather than carry it into the opening 226.

The opening 226 in the housing 40 communicates with the pressure chamber 66ᵃ in which the pilot valve 66 is received. This chamber is constantly filled with fluid under pressure for actuating the various diaphragm valves 1 to 6, inclusive, of the distribution device C.

As has been heretofore stated, the volume of brine flow to the softener bed during the regeneration period is controlled by a diaphragm valve 24 associated with the brine tank B. This valve and the details of the operating mechanism therefor are illustrated in Figures 1, 19, 20, 21, 22, 23, 24, 25 and 25ᵃ.

Referring first to Figures 1 and 19, it will be noted that the valve 24 controls the flow of brine into the pipe 25 (and hence into the opening 26 and the chamber 190 of the distribution device C). This valve is of the diaphragm type and comprises a main body portion 250 having a threaded opening 251 in which the upper end 23 of the pipe 21 is received and a second threaded opening 252 in which one end of the pipe 25 is received. Intermediate the openings 251 and 252 are transverse partitions 253 and 254 connected by a longitudinal web 255. The web 255 is provided with an opening 256 whereby the passage of fluid may be permitted from the pipe 21 to the pipe 25, and vice versa, when said opening is unobstructed. The valve 24 comprises valve sections 257 and 258 in addition to the body portion 250. A diaphragm 257ᵃ is interposed between the body 250 and the section 257 and a gasket 258ᵃ is interposed between the sections 257 and 258.

The valve section 258 is provided with a chamber 259 in which is mounted a strainer plug 260 similar in construction to the plug 218 mounted in chamber 217 of the housing 40 shown in Figure 3. The plug 260 is provided with a hollow stem 261 which extends into an angular passageway 262 in the valve section 258. The section 258 is further provided with a circular chamber 263 into which the passageway 262 opens.

As is best shown in Figure 19, a continuous passageway is provided between a chamber 264 in the upper part of the body 250 and the chamber 259 in the valve section 258. This passageway comprises an opening 265 in the body 250, an opening 266 in the diaphragm 257ᵃ, an opening 267 in the valve section 257, an opening 268 in the gasket 258ᵃ, and an opening 269 in the valve section 258. It will be clear from the foregoing that any positive pressure condition existing in the chamber 264 will be communicated to the chamber 263 through the continuous passageway 265—269; the hollow stem 261 of the strainer plug 260; and the passageway 262.

The diaphragm 257ᵃ is provided with a central aperture 275 for the reception of a nut having an internally threaded shank 276 extending axially from a substantially circular head 277. A metallic cup shaped element 278 is provided with an aperture 279 of a size adapted to snugly receive the shank 276. The hollow portion of the cup member 278 is formed to receive an annular packing element 280. The packing element 280 is provided with an axial opening 281 and a bolt 282 extends through said opening and has a threaded stem received in the shank 276. The bolt 282 serves to clamp the diaphragm between the head 277 and the cup 278 and at the same time to maintain the packing 280 assembled within said cup. The exposed face 280ᵃ of the packing 280 is adapted to be held against an annular tapered seat 284 formed on the web 255, and when so held, all flow of fluid through the valve in either direction is prevented.

A very important feature of the valve 24 is the provision of means conducive to quiet operation and gradual cutting-off of the flow through the valve without chatter. The above results are attained by providing the bolt 282 with a head 283 having an annular portion 285 tapered on substantially a 45° angle and a substantially cylindrical portion 286 of a desirable width M; the tapered portion 285 and the cylindrical portion 286 being connected by a curved portion struck on a suitable radius R, as indicated in the exaggerated Figure 21. The rounded surface between the tapered portion and the cylindrical portion cooperates with the edge of the valve seat 284 and serves to gradually cut off the flow of fluid through the valve seat opening 256 and in this manner whistling and squealing noises otherwise incidental to flow cut-off are eliminated. The operation of the valve is further improved by forming the annular valve seat 284 with a 5° taper.

The intermediate valve section 257 is provided with a shallow circular recess 290 adjacent one side of the diaphragm 257ᵃ. The chamber 290 receives the nut head 277 and further functions as a receiver for pressure fluid intended to actuate the diaphragm 257ᵃ to close the valve. A generally L-shaped passageway 291 is formed in the valve section 257. One end 292 of said passageway communicates with the upper portion of the chamber 290. This arrangement is important because it permits exhausting of the chamber at the highest point thereof and thereby precludes the formation of an air pocket in the chamber 290 which would tend to make the valve chatter. The opposite end 293 of the passageway 291 opens into the face of a boss 294. The face of the boss 294 is made smooth and is thus adapted to provide a seat for a disc type pilot valve 296. The valve section 257 is further provided with an L-shaped passageway 297, one leg 298 of which is horizontal and opens into the face of the boss 294 and the other leg 299 of which is vertical and communicates with an exhaust or drain tube 300 open to the atmosphere.

The valve section 258 is further provided with chambers 301 and 301ᵃ adjacent to the chamber 263. One end 303 of the shaft 302 extends through a drive member 304 for the pilot valve 296. A pin 306 secures the drive member 304 to the shaft 302. The end 303 of the shaft is rounded as indicated at 305 and engages the pilot valve 296 as shown. The drive member 304 is provided with longitudinally extending pins 307 and 308 adapted to project into recesses 309 and 310 extending part way through the pilot valve disc 296. The pilot valve 296 is positioned in the chamber 263 so that a face 312 thereof is adjacent the rounded portion 305 of the shaft 302 and its opposite face 313 mates with the face of the boss 294.

Suitable packing 314 is disposed in the chamber 301 in surrounding relation to the shaft 302 and seals the shaft against leakage of pressure fluid from the chamber 263. The packing 314 is compressed by a washer 315 slidably mounted on the shaft 302 and threaded into the wall of chamber 301. A second washer 316 is arranged on said shaft in the chamber 301a adjacent the driving member 304. This second washer serves as a bearing support for one end of the shaft 302. A spring 317 surrounds the shaft 302 between the washers 315 and 316 and urges the pilot valve disc 296 against its seat.

The outer end 318 of the shaft 302 is supported in a web 319 depending from the valve section 258. The portion of said valve section defining the packing chamber 301 terminates in a wall 320 spaced from the web 319 to provide an opening for the reception of an actuating arm 321. The arm 321 is secured to the shaft 302 by a screw 322 whose shank 322a extends therethrough as shown in Figure 25a. This arrangement assures proper assembly or indexing of the actuating arm on the shaft 302.

It will be noted from Figure 19 that the periphery of the pilot valve is spaced from the walls of the chamber 263 and that the pins 307 and 308 fit with clearance in the recesses 309 and 310. This arrangement permits a more or less flexible or non-rigid drive between the drive member 304 and the pilot valve disc 296; the disc being free to pivot somewhat upon the rounded end 305 of the shaft 302 to accurately align itself at all times upon the boss 294. This same flexibility of drive is provided for the master pilot valve disc 66 of the control unit C.

The pressure of the fluid in the chamber 263 aids in maintaining the pilot valve disc 296 in engagement with its seat. However, the spring 317 maintains such engagement in the absence of pressure fluid in said chamber and thereby precludes the entry of dirt or foreign matter between the valve disc and its seat. The spring 76 of the fluid distribution device C functions in the same manner.

The pilot valve disc 296 is illustrated in perspective in Figure 20. As is here shown, the same is provided with through ports 325 and 326, respectively, each port being spaced the same distance from the axis of the disc. The pilot valve disc 296 is further provided with a U-shaped passageway generally indicated by the numeral 327 and comprising leg portions 328 and 329. The leg portion 329 is arranged on the axis of the disc and the leg 328 is spaced the same distance from the axis as the ports 325 and 326.

It will be noted from Figure 19 that the leg 329 is in alignment with the portion 298 of the exhaust passageway 297. It is to be understood that the end 293 of the passageway 291 is spaced from the portion 298 a distance equal to the spacing of the ports 325 and 326 from the leg 329, whereby either of the ports 325 or 326 and the leg 328 may be brought into registration with the portion 293 to effect closing and opening of the valve in a manner which will be described hereinafter.

A suitable linkage for operating the pilot valve shaft 302 through the arm 321 is shown in detail in Figures 22, 23, 24 and 25. Here, a bracket 335 is shown secured to the valve 24 by a series of screws 336. The lower end of the bracket is provided with a threaded aperture 337 (see Figure 25) to receive a stud 338. The stud 338 is preferably provided with a hexagonal portion 339 to aid in tightening the stud 338 in the aperture 337. The stud 338 is further provided with cylindrical portions 340 and a threaded end 341. A lever 342 is pivotally mounted on the portions 340 and is retained assembled on said stud by a cap nut 341a.

The lever 342 includes a normal arm 343 and an offset arm 344 best shown in Figure 24. The end of arm 344 is bifurcated as indicated at 345 and the arm 343 is provided with threads 346. A threaded counterweight 347 and a nut 348 are mounted on the threaded portion of the arm 343, the counterweight being adjustable to any position desired and the nut serving to lock the counterweight in the desired position of adjustment.

The actuating arm 321 is bifurcated as indicated at 349 and is aligned with the bifurcated end 345 of the lever 342. A hollow rod 350 is positioned between the bifurcated ends 349 and 345 and is pivotally secured to the actuating arm 321 by a pin 351 and is likewise pivotally secured to the arm 344 of the lever 342 by a pin 352. The rod 350 is provided with spaced collars 353 and 353a adjustably mounted thereon. A float 354 in the form of a ball is slidably mounted on the rod between said collars. A cotter pin 355 at the end of the rod 350 prevents inadvertent disassembly of the collar 353a and float 354.

The counterweight 347 and the associated lever arm 343 are of a combined mass sufficient to counterbalance the dead weight of the valve operating linkage comprising the actuating arm 321, the lever arm 344 and the hollow rod 350. The counterweight 347 is adjustable lengthwise of the arm 343, whereby the linkage may be nicely counterbalanced. The weight of the ball float 354 is sufficient to cause the lever 342 to pivot upon its supporting stud and to cause the arm 321 to rotate the drive shaft 302 of the pilot valve 396 when the weight of said float is imposed upon the collar 353a. Such imposition occurs when the level in the brine tank is being lowered and the float is gradually descending on the rod 350 with the liquid level and engages the collar 353a. Upon further lowering of the liquid level, the weight of the float carries the rod 350 bodily downward and thereby moves the arm 321 to an angular position in which its center line approximates the position indicated by the dot-and-dash line 356 (Figure 22). When the liquid level is rising in the brine tank, instead of falling, the float 354 will rise on the rod 350 without affecting the position of the arm 321 and lever 342 until it engages the collar 353, whereupon it will carry the rod 350 bodily upward and thereby move the arm 321 and lever 342 to an angular position in which the center line of the arm 321 approximates the position indicated by the dot-and-dash line 357.

Let it be assumed that the cycle of regeneration has reached the salting stage and that the brine is at the proper level in the brine tank, the arm 321 will then be in its upper angular position as indicated in Figure 1. Any suction induced in the pipe 25 at this time by the injector 185 will tend to create a vacuum in the opening or chamber 264 of the valve 24. This condition will be communicated through the passageway 265—269, the hollow stem 261 of the strainer plug 260, and the passageway 262 to the chamber 263 in which the brine pilot valve disc 296 is positioned. It is to be understood that when the arm 321 is in its upper angular position, the passageway 326 in the pilot valve 296 is in registration with the passageway 291 in the valve section 257. Hence, the pressure condition in the chamber 263 will be communicated through the port 326 and passage 291 to the diaphragm chamber 290. A partial vacuum condition in the chamber 264 will provide a like condition in the chamber 290. The higher or approximately atmospheric pressure on the fluid in the pipe 21 acts against the lower portion 257ᵇ of the diaphragm 257ᵃ to displace the annular member 280 from the seat 284 and open the valve to permit the injector 185 to withdraw brine from the brine tank B through the pipe 21, valve 24 and pipe 25 into the chamber 190 of the fluid distribution device C. The flow of brine from the chamber 190 through the distribution device to the softener tank 14 already has been described in connection with Figure 28, and repetition here would be superfluous.

So long as the injector 185 continues to draw brine from the brine tank, the brine level will be lowered and the float 354 will descend with said level until it engages the collar 353ᵃ, and then arm 321 and lever 342 will be angularly rotated counterclockwise in the manner before described. The angular movement of the arm 321 imparts rotation to the shaft 302 and the pilot valve 296 carried thereby so that the port 326 is moved out of alignment with the passageway 291. In fact, the brine pilot valve herein disclosed is turned through an angle of approximately 60° by the movement of the arm 321 from one extreme angular position to the other, as indicated by the dot-and-dash lines 356 and 357 of Figure 22. However, this angle of movement is not critical and may be varied as desired provided the ports 325 and 326 are correspondingly reallocated. When the arm 321 reaches its lower angular position, the pilot valve will have been turned to a position such that the U-shaped passageway 327 registers with the passageways 291 and 298 in the valve section 257; the legs 328 and 329 of said U-shaped passageway being respectively aligned with the passageways 291 and 298. Inasmuch as the passageway 298 is open to the atmosphere through tube 300, the diaphragm chamber 290 will be placed under atmospheric pressure. The above rotation of the brine pilot valve disc 296 occurs, of course, while the injector 185 is operating. Therefore, a negative pressure or suction will exist in the chamber 264 and the diaphragm 257ᵃ will be actuated by atmospheric pressure to close the valve and cut off the supply of brine to the injector.

The timing of the salt-rinse step is such that the flow of water through the fluid distribution device C and injector will continue for a considerable period of time after salt injection has ceased in order to rinse or flush out the brine from the softener bed 16. In other words, the brine flow continues for from three to about ten minutes and the rinse water flows for about fifteen minutes thereafter.

After rinsing is completed, the master pilot valve disc 66 will have reached a position permitting resumption of the normal softening operation, that is, valves 1 and 2 will again be open and valves 3, 4, 5 and 6 will be closed. The closing of valve 3 cuts off flow to the injector and the closing of valve 4 shuts off flow through drain pipe 19. However, the opening of valve 1 allows water to flow into the softener tank and a back pressure is set up in the pipe line 13 which causes a portion of the water entering the distribution device to be diverted from the passage 163 into the orifice 203 and chamber 190 of the distribution device C, and finally into pipe 25. The water flowing into the pipe 25, of course, will build up pressure in the chamber 264 in the valve 24. When this pressure exceeds atmospheric, the member 280 will be unseated and the water will readily pass through the passage 256 in the valve seat 284, enter the pipe 21, and discharge therefrom into the lower portion of the brine tank B. Upon continued discharge, the level in the brine tank will gradually rise and the float 354 will be carried upwardly until it engages the collar 353 on the rod 350 and return the arm 321 and the lever 342 to their original angular position. Such movement of the arm 321 will necessarily rotate the shaft 302 and the brine pilot valve 296 and return the same to their original position.

The initial return rotation of the brine pilot valve disc 296 through the float mechanism causes the leg 328 of the U-shaped passage 327 to become disaligned with the passage 291. This cuts the chamber 290 off from the atmosphere. However, since the pressure in said chamber is not changed the valve 24 remains open and does not close until the brine pilot valve 296 approaches its final position. By the time that the float 354 has moved the arm 321 into its upper angular position, the port 326 will have been brought into registration with the port 291 and then the pressure of the fluid in chamber 264 will be communicated to the chamber 290 and the diaphragm will be positively actuated to gradually cut off the flow through the passage 256 in the valve 24. Thus, the pressure of the fluid flowing through the valve 24 is itself utilized to actuate the diaphragm 257ᵃ to close the valve.

It will be apparent from the foregoing that the fluid distribution device C and injector 185 are so associated with the valve 24 on the brine tank that the brine is automatically withdrawn and fresh water is introduced into the brine tank to serve as a subsequent charge. This same automatic draining and refilling occurs each time that the softener bed is regenerated. It will also be apparent that the volume of the brine charge may be varied by adjusting the position of the collar 353ᵃ on the rod 350.

The valve 24 has been shown in open position in Figure 19 for convenience in illustration, and it is to be clearly understood that this valve is normally closed and remains closed during normal softening service and that the same is open only during the times that the brine charge is being withdrawn from the brine tank B and fresh water is being introduced into the brine tank to provide a new charge.

In the foregoing description of the automatic operation of the brine tank, no function has been ascribed to the port 325 of the brine pilot valve disc. In practice this port is packed with a waterproof grease 325ᵃ to lubricate the valve disc 296 in its travel over the valve seat 294. Any pressure fluid in the chamber 263 tends to force the grease against the valve seat 294 and thereby maintains a sufficient film of grease on said seat to keep it properly lubricated.

The distribution of fluid through the system to effect regeneration and the automatic operation of the brine tank having been described, consideration will now be given to the details of operation of the three pairs of valves 1—2, 3—4, and 5—6, respectively, which affect the various steps of "Service," "Backwash," and "Salting-Rinsing." For this purpose, it will be convenient to first refer to Figure 29 which diagrammatically illustrates the relative positions of the control knob 54, the ports and grooves of the master pilot valve 66 and the principal ports of the distribution plug X. In this view, as well as in Figures 30 and 31, the various grooves and ports have been shown out of proportion in order to better illustrate registration and overlapping thereof.

It will be recalled that the master pilot valve disc 66 is subjected to constant fluid pressure in the chamber 66ª of the master control device D. Hence, fluid under pressure is always present in the pressure groove 86 of the master control valve 66 being admitted thereto by the through-ports 82, 83, 84 and 85.

The exhaust groove 90 of the master pilot valve normally registers with the port 128 of the distribution plug X, and the leg 89 of the U-shaped passageway 87 is in alignment with the port 128. The other leg 88 of said U-shaped passageway is continuously in registration with the axial port 125 of the distribution plug X. Inasmuch as the passageway 87 controls the exhaust of fluid from the valves 1 to 6 and specifically from the pressure chambers of diaphragm valves 1 and 2, when the passage 89 and port 128 are in alignment as shown in Figure 29, these valves will be open.

Upon reference to Figures 3, 4, 5, 7 and 10, it will be seen that pressure fluid from valve chamber 1ᶜ will be exhausted through passage 1ᵇ, and groove 1ª in the cover plate P; shallow groove 129', longitudinal passage 129, transverse passage 127 and port 128 in plug X; passage 108 in gasket 105; port 110 in valve seat 95; U-shaped passageway 87 in the master pilot valve 66; exhaust port 99 in valve seat 95; passage 107 in gasket 105; exhaust port 125 and passage 126 in plug X; passages 141 and 142 in cover plate P; opening 144 in gasket G; and finally through drain pipe 150. Thus, the valve 1 can obviously be opened by the pressure of the raw water in passage 160 of the body F upon exhaust of pressure fluid from valve chamber 1ᶜ.

Fluid under pressure is simultaneously exhausted from the chamber 2ᶜ of valve 2 by flowing through the passageway 2ᵇ and groove 2ª in the cover plate P; shallow groove 130', longitudinal passageway 130, transverse passageway 127 and port 128 in the plug X. The flow from port 128 is in the manner just described in connection with the exhausting of valve chamber 1ᶜ. Accordingly, the valve 2 will be opened by the pressure of the softened water in the passage 166 of the body F.

The pressure groove 86 of the master pilot valve 66 also normally registers with the ports 131 and 135 in the distribution plug X. The passages 85 and 83 are in direct alignment with the ports 131 and 135, respectively, as shown in Figure 29, and therefore, pressure fluid may simultaneously flow through the passages 85 and 83, respectively, of the pilot valve into said ports. The port 131 is in communication with the pressure chambers of the pair of valves 3 and 4; and the port 135 is in communication with the pressure chambers of another pair of valves 5 and 6. Application of pressure fluid to ports 131 and 135 maintains valves 3, 4, 5 and 6 closed while valves 1 and 2 are open.

The flow to valve 3 is as follows. Pressure fluid passing through passage 85 and pressure groove 86 (see Figure 9) flows through the opening 102 in the valve seat 95; opening 110 in the gasket 105; port 131, transverse passage 132, longitudinal passage 133 and shallow groove 133' in the plug X; and groove 3ª and passage 3ᵇ in the cover plate P to the valve chamber 3ᶜ. Pressure fluid is distributed from the transverse passage 132 to the valve 4 as follows: longitudinal passage 134 and shallow groove 134' in the plug X; groove 4ª and passageway 4ᵇ in the cover plate P, and thence into the pressure chamber 4ᶜ of the valve 4.

The total pressure on the diaphragm G in chamber 3ᶜ exceeds that in passage 160 acting upon the underside of the valve guide 111 and valve 3 is thus maintained closed. Similarly, valve 4 is maintained closed by applying to the diaphragm a total pressure exceeding that in passage 166.

The application of pressure fluid to the third pair of valves 5—6 to maintain the same closed occurs as follows: pressure fluid from the passage 83 and the pressure groove 86 of the master pilot valve 66 passes through aperture 101 in the valve seat 95; passage 109 in the gasket 105; port 135, transverse passage 136, longitudinal passageway 137, and shallow groove 137' in the plug X; groove 5ª and passage 5ᵇ, formed in the underside of the cover plate P, to valve chamber 5ᶜ. Pressure fluid flows to pressure chamber 6ᶜ of the valve 6, from the passage 136 to longitudinal passage 138 and shallow groove 138' in plug X; groove 6ª and passage 6ᵇ in the cover plate P and thence into said valve chamber 6ᶜ.

From the foregoing it will be apparent that during normal softening "Service," a first pair of diaphragm valves 1 and 2 has the pressure thereon relieved so that the same can open; a second pair of diaphragm valves 3 and 4, and a third pair of diaphragm valves 5 and 6 are subjected to fluid pressure and are thereby maintained closed. The flow through the distribution device C in accordance with the above is schematically shown in Figure 26.

In order to initiate regeneration of the softening bed, the control knob 54 is turned clockwise approximately half a revolution. The turning of the knob 54 rotates the master pilot valve 66 so that the grooves and ports thereof assume the position relative to the distribution plug X shown in Figure 30, whereby to initiate the "Backwash." It will be seen upon reference to this Figure that the exhaust groove 90 is in registration with the passageway 135 of the distribution plug X, and it will be recalled that said passageway communicates with the chambers 5ᶜ and 6ᶜ of the valves 5 and 6. Hence, pressure fluid from these valve chambers will be exhausted through the passageways already described and said valves will be permitted to open. The opening of the valves 5 and 6 permits backwash flow through the distribution device C in the manner diagrammatically indicated in Figure 27. It will be further noted from Figure 30 that the pressure groove 86 is in registration with the ports 128 and 131 controlling the flow of pressure fluid to valves 1—2 and 3—4, respectively. Hence, the valves 1, 2, 3 and 4 will all be simultaneously maintained in closed position by the admission of pressure fluid to their respective pressure chambers through the passageways already described.

The duration of the backwashing period is predetermined by the timing mechanism and the location of the ports in the master pilot valve disc and distribution plug X. Accordingly, the backwashing step may be timed to last for a period of about five to ten minutes or less, as conditions require. However, this period may be varied by the installer to suit the water conditions on a particular job by locating the pin 57 to provide a shorter backwash period. To this end an adjustable stop may be provided as shown in Figure 12a. Here a slidable plate 57a is adjustably held in position by a screw 57b which extends through an elongated slot 57c in said plate. A projection 57d is carried by the plate and is adapted to be engaged by a control knob 54a to limit its movement clockwise. Any suitable graduations may be provided upon the plate 57a.

The relative positions of the ports and grooves of the master pilot valve 66 and the distribution plug X to effect "Salting-rinsing" is diagrammatically shown in Figure 31. Here, the exhaust groove 90 is in registration with the port 131 of the distribution plug. This port communicates with the pressure chambers 3c and 4c of valves 3 and 4 and when said port is open to exhaust, these valves are permitted to open. It will be further noted that the pressure groove 86 is in registration with the ports 128 and 135 of the distribution plug and that therefore pressure fluid is admitted into said ports. The port 128 communicates with chambers 1c and 2c of valves 1 and 2 and these valves will now be closed. The port 135 communicates with chambers 5c and 6c of valves 5 and 6 and these valves will also be closed. The flow through the distribution device when the valves 3 and 4 are open and the valves 1, 2, 5 and 6 are closed is diagrammatically illustrated in Figure 28.

The timing of the regeneration cycle may be as follows: backwashing may require five to ten minutes or less; brine flow may last for from three to ten minutes, and rinsing up to fifteen minutes or more; therefore, all told, the cycle of regeneration will require about thirty minutes.

Quiet operation of the various valves 1, 2, 3, 4, 5 and 6 in the fluid distribution device is facilitated by locating the passageways 1b, 2b, 3b, 4b, 5b and 6b, respectively, at a point in the upper portion of the associated pressure chambers 1c, 2c, etc., as shown in Figure 4. Such location prevents chattering, etc., by precluding the trapping of air in said chambers.

All of the parts of the foregoing apparatus which are subjected to contact with water or brine are preferably made of corrosion-resistant materials.

A further modification of the invention is illustrated in Figures 32, 33 and 34, wherein an arrangement is diagrammatically shown for manually controlling the regenerating cycle of the softener from a distance remote from the softening apparatus itself. When the softening apparatus is employed for domestic use, the master control mechanism D may be located in the kitchen upon a panel 465 as shown in Figure 32. When the softening apparatus is employed in a power plant or other establishment the control unit may be mounted upon a main control panel or other convenient location.

Remote control of the softening apparatus, according to the present invention, is obtained by forming the master control apparatus D as a separate unit and installing it at any point desired. Such control is then connected by suitable tubing with the fluid distribution device C; the tubing being arranged so as to apply or exhaust pressure fluid to the diaphragm valves 1, 2, 3, 4, 5 and 6 to actuate these valves in the same sequence described hereinbefore.

Figure 33 diagrammatically illustrates in perspective the various tube connections from the control unit to the fluid distribution device. Figure 34 diagrammatically indicates with more particularity the manner of connecting certain of the passageways in the master control device with their cooperating passageways in the distribution device.

In effecting remote control, one end of the master control housing 40 may be closed by a gasket 500 and a cover plate 501 secured by screws or other means to the housing 40. The gasket 500 and cover plate 501 are provided with passageways registering with the openings in the pilot valve seat 95 and with the pressure inlet opening 216 in the housing 40.

Referring to Figure 34, the gasket 500 is provided with a passageway 216a and the cover plate 501 is provided with an opening 216b in registration with said passageway. A tube 216c serves as a conduit for conducting pressure fluid from the passageway 214 in the boss 106 of the cover plate P of the distribution device. In order to adapt the cover plate P for remote control, a gasket 503 and a plate 504 are secured to the boss 106. The gasket is provided with an opening 216d and the plate 504 is provided with an aligned opening 216e. One end of the tube 216c is received in the opening 216b and its opposite end is received in the opening 216e. It will be understood, however, that fluid pressure need not necessarily be taken from the fluid distribution device C and that, if desired, the same may be derived from a source of supply more convenient to the control unit D. In such case the tube 216c will be connected with such source and not with the plate 504. The openings 216d and 216e are then unnecessary and are omitted.

The axial opening 88 in the master pilot valve disc 66, and which opening is aligned with the opening 99 in the valve seat, registers with an opening 99a in the gasket 500 and with an opening 99b in the cover plate 501. A tube 99c is secured in the plate 501 in registration with the opening 99b. The opposite end of the tube 99c registers with an opening 99d in the gasket 503 and an opening 99e in the cover plate 504. The openings 99d and 99e in turn register with the axial exhaust opening 125 in the plug X. The opening 125 communicates with the passage 126, which merges into the passage 141 in the boss 106, and the passageway 142. It will be recalled that the passageway 142 communicates with the drain pipe 150. Thus, it will be clear that fluid exhausted by the pilot valve disc 66 will be conducted through the tube 99c to the plug X in the fluid distribution device C and thence into the drain pipe 150. Here again, the tube connection with the plate 504 may be omitted, if desired, and the fluid drained at a point adjacent to the control unit.

In a similar manner, the port 100 in the valve seat 95 is placed in communication with the port 128 in the plug X by a tube 100c extending from an opening 100b in the cover plate 501 to an opening 100e in the cover plate 504; a tube 101c connects an opening 101b in the cover plate 501 (aligned with opening 101 in valve seat 95) with an opening 101e in the cover plate 504 (aligned with port 135 in the distribution plug); and a tube 102c connects an opening 102b in the cover plate 501 (aligned with opening 102 in valve seat 95) with an opening 102e in the cover plate 504 (aligned with opening 131 in the distribution plug).

The packing leakage port 145 of the housing 40 may be conveniently connected with the exhaust tube 99c by a short tube 145c as shown in Figures 35 and 36, or the same may be connected with any suitable drain.

It will be manifest from the foregoing that the master pilot valve 66 supplies fluid to the ports in the plug X through the various tubes 99°, 100°, 101° and 102° in a manner similar to that when the parts are arranged as shown in Figure 3; but the use of the tubes provides the additional convenience of enabling the disposition of the master control valve at a point remote from the softening apparatus itself, as diagrammatically illustrated in Figure 34.

The term "fluid distribution unit", wherever such term is specifically employed in any of the claims herein, is intended in such claims to embrace a structure wherein a plurality of valves is contained in a body or housing, as contradistinguished from an arrangement such as disclosed for example, in Pick Patent No. 2,076,321, wherein the several separate valves are scattered and interconnected by an elaborate pipe system.

While the invention has been described and illustrated in several forms, the same may be embodied in other arrangements without departing materially from the spirit thereof or the scope of the appended claims.

I claim:

1. Water softening apparatus comprising, a softener tank; a brine tank; a fluid distribution unit; a water supply pipe and a drain pipe connected to said fluid distribution unit; piping connecting said fluid distribution unit with said softener tank and brine tank, respectively, said fluid distribution unit having passageways therein and a plurality of individual fluid pressure responsive diaphragm valves in said fluid distribution unit arranged to control the flow through said passageways, said fluid distribution unit further having conduits for admitting and exhausting operating fluid on one side of the diaphragm of said diaphragm valves, the opposite side of the diaphragm of said diaphragm valves being subject to the pressure of fluid in said passageways, said passageways and diaphragm valves being arranged to normally admit water into one end of said softener tank during normal softening operation, to admit water into the opposite end of said softener tank to effect backwashing, and to thereafter admit brine from said brine tank and water for rinsing into said first-mentioned end of said softener tank to regenerate and flush the softener bed; and means for controlling the application and exhaust of pressure fluid to said diaphragm valves for controlling the opening and closing of said diaphragm valves.

2. In water softening apparatus, the combination comprising, a softener tank containing a bed of softener material; a fluid distribution unit having passageways for flow of fluid therethrough; piping connecting said fluid distribution unit with the upper and lower ends of said softener tank; a raw water supply pipe connected to said fluid distribution unit and a service pipe for softened water also connected to said fluid distribution unit; valve means including two diaphragm valves in said fluid distribution unit; passageways for raw and softened water in said fluid distribution unit, said valves and passageways being arranged so that when said valves are open, raw water will flow under control of one of said valves from the supply pipe and distribution unit to the softener tank and softened water will flow under control of the other of said valves from the softener tank to the distribution unit and service pipe; and means including conduits in said fluid distribution unit communicating with one side of the diaphragm of said valves and a pilot valve for controlling the application and exhaust of pressure fluid to said diaphragm valves, the opposite side of the diaphragm of said valves being subject to the pressure of the fluid in the passageways of said fluid distribution unit.

3. In a water softening apparatus, the combination comprising, a softener tank; a fluid distribution unit; piping connecting said fluid distribution unit with the upper and lower ends of said softener tank; a raw water supply pipe connected to said fluid distibution unit; a service pipe for softened water also connected to said fluid distribution unit; a pair of diaphragm valves each having a diaphragm in said fluid distribution unit, and passageways for raw and softened water in said fluid distribution unit arranged and constructed so that when said pair of valves is open, raw water will flow under control of one of said diaphragm valves from the supply pipe and distribution unit to the softener tank and softened water will flow under control of the other of said diaphragm valves from the softener tank to the distribution unit and supply pipe and means for admitting fluid under pressure to one face of the diaphragm of each of said pair of diaphragm valves to close said valves and for exhausting said pressure fluid to allow said valves to open, the opposite face of the diaphragm of each of said diaphragm valves being subject to the pressure of the fluid in the fluid distribution unit.

4. In water softening apparatus, the combination comprising, a softener tank; a fluid distribution unit; inlet piping connecting said fluid distribution unit with the upper end of said softener tank and inlet piping connecting the lower end of said softener tank with said fluid distribution unit; a water supply pipe connected to said fluid distribution unit; a drain pipe also connected to said fluid distribution unit; a pair of diaphragm valves in said fluid distribution unit; passageways in said fluid distribution unit, said valves and passageways being arranged and constructed so that when said pair of valves is open, water will flow under the control of one valve of said pair from the distribution unit to the lower end of the softener tank through said outlet piping and under the control of the other valve of said pair from the upper end of the softener tank through said inlet pipe to the distribution unit and out of said drain pipe; and means for controlling the operation of said pair of valves including conduits in said fluid distribution unit for controlling the application and exhaust of pressure fluid to one side of the diaphragm of said valves, the opposite side of the diaphragm of said valves being subject to the pressure of the fluid in the passageways of said fluid distribution unit.

5. Water softening apparatus comprising, a softener tank; a brine tank; a fluid distribution unit; a raw water supply pipe, a service pipe for softened water, and a drain pipe connected to said fluid distribution unit; piping connecting said fluid distribution unit with said softener and brine tanks, respectively, said fluid distribution unit having passageways therein and housing six diaphragm valves, each having diaphragm means for controlling flow through said fluid distribution unit, said passageways and diaphragm valves being arranged therein so that one pair of valves controls the flow of raw water through said fluid distribution unit from said supply pipe to said softener tank and from said softener tank to said service pipe during normal softening operation, another pair of valves not including either valve of the first pair controls the flow of raw water from said supply pipe to said softener tank and from said softener tank to said drain pipe during backwashing, and the third pair of valves not including any valve of the first and second pairs controls the flow of brine and rinse water through said fluid distribution unit from said brine tank and raw water supply pipe, respectively, to said softener tank and from said softener tank to said drain pipe during brining and rinsing; and a master control device for successively rendering said pairs of valves effective, said master control device including means for admitting fluid under pressure to one face of said diaphragm valves to close said valves and for exhausting said pressure fluid to allow said valves to open.

6. Water softening apparatus comprising, in combination, a softener tank; a fluid distribution unit; inlet piping connecting said fluid distribution unit with the upper end of said softener tank; outlet piping connecting the lower end of said softener tank to said distribution unit; a brine tank; brine piping connecting said brine tank with said fluid distribution unit; an injector operatively associated with said brine piping and said fluid distribution unit; a water supply pipe and a drain pipe connected to said fluid distribution unit; fluid pressure responsive valve means and passageways in said distribution unit arranged and constructed so that when said valve means is open water flowing through said distribution unit and inlet piping to the softener tank will operate the injector and draw brine from said brine tank, and the effluent from said softener tank will be returned to the fluid distribution unit through said outlet piping to pass through said distribution unit and to be discharged through said drain pipe; and means for controlling the application and exhaust of pressure fluid to said pressure responsive valve means to permit opening and closing said valve means for establishing and cutting off the flow of water to the injector.

7. Water softening apparatus comprising, in combination, a softener tank; a fluid distribution device; means for supplying water to said fluid distribution device; inlet piping connecting said fluid distribution device with the upper end of said softener tank; outlet piping connecting the lower end of said softener tank to said distribution device; a brine tank; brine piping connecting said brine tank with said fluid distribution device; an injector operatively associated with said brine piping and said fluid distribution device; a valve connected in said brine pipe line arranged and constructed so that it will be opened in consequence of suction created by said injector and allow withdrawal of brine from said brine tank; a drain pipe connected to said distribution device; valve means and passageways in said distribution device arranged and constructed so that when said valve means is open water flowing through said distribution device and inlet piping to the softener tank will operate the injector and draw brine from said brine tank, and the effluent from said softener tank will be returned to the fluid distribution device through said outlet piping to pass through said distribution device and to be discharged through said drain pipe; and means for opening and closing said valve means for establishing and cutting off the flow of water to the injector.

8. In combination, a tank containing a bed of material requiring periodic regeneration; a receptacle containing fluid capable of regenerating said bed; a fluid distribution unit; injector means operatively associated with said tank, receptacle and fluid distribution unit; a raw water supply pipe, a service pipe, and a drain pipe connected to said fluid distribution unit; piping connecting said fluid distribution unit with said tank and receptacle; a plurality of fluid pressure responsive valves in said fluid distribution unit arranged to open successively in pairs; passageways in said fluid distribution unit, said valves and passageways being arranged and constructed so that when only one pair of valves is open water is allowed to flow from said supply pipe through said fluid distribution unit into said tank to flush out foreign matter and flow is allowed from said tank through said fluid distribution unit to said drain pipe; and when only a second and different pair of said fluid pressure responsive valves is open water is allowed to flow from said supply pipe to said injector to operate said injector means to introduce regenerating fluid from said receptacle into said tank through said fluid distribution unit to regenerate said bed and to thereafter admit rinse water through said fluid distribution unit into said tank, and flow is allowed from said tank through said fluid distribution unit to said drain pipe, said second pair of valves including neither of the valves of said first-mentioned pair of valves; and means for controlling the opening and closing of said pairs of valves to successively effect said flushing, and said regenerating and rinsing.

9. Water softening apparatus comprising, in combination, a softener tank containing a bed of softener material; a fluid distribution device; a water supply pipe and a drain pipe connected to said fluid distribution device; piping connecting said fluid distribution device to opposite ends of said softener tank; a brine tank; brine piping connecting said brine tank with said fluid distribution device; an injector associated with said fluid distribution device for drawing brine from said brine tank into said distribution device and ejecting it therefrom into said softener; valve means in said fluid distribution device disposed intermediate said supply pipe and said injector and adapted to be opened and closed to control the flow of water to said injector; and a normally closed valve associated with said brine piping arranged and constructed so that it will be opened in consequence of suction created by said injector and allow withdrawal of brine from said brine tank.

10. Water softening apparatus comprising, in combination, a softener tank containing a bed of softener material; a brine tank; piping connecting said brine tank with said softener tank; an injector operatively associated with said piping for drawing brine from said brine tank and injecting it into said softener; water supply means connected with said injector for operating the same, and a normally closed diaphragm valve associated with said brine tank and piping, said diaphragm valve having passage means establishing communication between one face of said diaphragm valve and said piping, whereby said diaphragm valve will be opened in consequence of suction created in said piping by said injector and allow withdrawal of brine from said brine tank.

11. Water softening apparatus comprising, a softener tank; a brine tank; a fluid distribution unit; a raw water supply pipe, a service pipe for softened water, and a drain pipe connected to said fluid distribution unit; piping connecting said fluid distribution unit with said softener and brine tanks, respectively, said fluid distribution unit containing a series of three successively operable pairs of valves and passageways cooperable with said valves constructed and arranged within said unit to control the flow of raw water through said fluid distribution unit from said supply pipe to softener tank and from said softener tank to said service pipe during normal softening operation when only one pair of valves is open, to control the flow of raw water from said supply pipe to said softener tank and from said softener tank to said drain pipe during backwashing when only a second pair of valves is open, and to control the flow of brine and rinse water through said fluid distribution unit from said brine tank and raw water supply pipe, respectively, to said softener tank and from said softener tank to said drain pipe during brining and rinsing when only a third pair of valves is open; and means for successively rendering said pairs of valves effective.

12. Apparatus comprising, a tank containing a bed of material requiring periodic regeneration; a fluid distribution device; a water supply pipe connected to said fluid distribution device; piping connecting said fluid distribution device with the upper end of said tank; additional piping connecting said fluid distribution device with the lower end of said tank; a receptacle for a regenerating solution; piping associated with said receptacle and connected with said fluid distribution device to permit withdrawal of solution from said receptacle and refilling of said receptacle; a float valve connected in said solution piping; an injector associated with said fluid distribution device, said float valve having a chamber communicating with said solution piping and being constructed and arranged to be opened in consequence of suction induced by said injector, and valve means in said fluid distribution device disposed intermediate said water supply pipe and said injector and adapted to be opened and closed to control the flow of water to said injector.

13. Water softening apparatus comprising, a softener tank; a brine tank; a fluid distribution unit; a raw water supply pipe, a service pipe for softened water, and a drain pipe connected to said fluid distribution unit; piping connecting said fluid distribution unit with said softener tank and brine tank, respectively, said fluid distribution unit having a series of passageways for flow of fluid therethrough and six pressure responsive diaphragm valves housed therein arranged to control the flow through said passageways; and a control device including a master pilot valve for substantially simultaneously admitting operating fluid to four of said diaphragm valves to maintain said valves closed and exhausting operating fluid from the other two of said diaphragm valves to allow said valves to open, said control device and said fluid distribution unit having passageways for valve operating fluid arranged to be placed in communication to allow opening operation of said diaphragm valves in consecutive non-overlapping pairs to successively effect: (1) normal softening operation by controlling flow through said fluid distribution unit from said supply pipe to said softener tank and from said softener tank to said service pipe, (2) backwashing by controlling the flow of raw water from said supply pipe to said softener tank and from said softener tank to said drain pipe, and (3) salting and rinsing by controlling the flow of brine and rinse water through said fluid distribution unit from said brine tank and raw water supply pipe, respectively, to said softener tank and from said softener tank to said drain pipe.

14. Water softening apparatus comprising, a softener tank; a fluid distribution device; a water supply pipe and a drain pipe connected to said fluid distribution device; piping connecting said fluid distribution device with the upper end of said softener tank; additional piping connecting the fluid distribution device to said softener tank; a brine tank; piping associated with said brine tank and connected with said fluid distribution device to permit withdrawal of brine from said tank and refilling of said tank; a valve connected in said brine pipe line; a float in said brine tank for controlling said valve; a normally fixed injector associated with said fluid distribution device, said valve having passage means providing cummunication with said brine pipe and being constructed and arranged to be opened in consequence of suction induced by said injector when said float is in its upper position; said valve including means actuated by said float in said brine tank for effecting closing of said valve after a predetermined volume of brine has been withdrawn from said brine tank by said injector, and valve means associated with said fluid distribution device adapted to be opened and closed for controlling the flow of operating fluid to said injector.

15. In combination, a water softener tank; a brine tank; piping and an injector associated with said tanks for withdrawing brine from the brine tank and introducing the same into said softener tank; means for supplying operating fluid to said injector; a diaphragm valve operatively associated with said brine tank and piping, said diaphragm valve having a diaphragm chamber formed therein; control means for controlling the admission and exhaust of fluid to said diaphragm chamber to control the operation of the diaphragm; a float in said brine tank operatively connected with said control means; and passage means cooperable with said control means for providing communication between said brine piping and said diaphragm chamber, whereby said diaphragm valve will be opened in consequence of suction induced by said injector when said float is in its upper position and allow withdrawal of brine from said brine tank.

16. In combination, a tank containing a bed of material requiring periodic regeneration; a receptacle for a solution for regenerating said bed; piping and an injector associated with said tank and receptacle for withdrawing solution from the receptacle and introducing the same into said tank; means for supplying operating fluid to said injector; a diaphragm valve operatively associated with said solution receptacle and piping, said diaphragm valve having a diaphragm chamber formed therein; control means for controlling the admission and exhaust of fluid to said diaphragm chamber to control the operation of the diaphragm; a float in said solution tank operatively connected with said control means; passage means cooperable with said control means for providing communication between said solution piping and said diaphragm chamber, whereby said diaphragm valve will be opened in consequence of suction induced by said injector when said float is in its upper position and allow withdrawal of solution from said solution tank; and further passage means cooperable with said control means for providing communication between said diaphragm chamber and the atmosphere, whereby said diaphragm valve will be closed by atmospheric pressure to cut off the supply of solution when said float is lowered by the withdrawal of a predetermined amount of solution from said solution tank.

17. In combination, a water softener tank; a brine tank; piping associated with said tanks for withdrawing brine from the brine tank and conducting the same to said softener tank; a diaphragm valve associated with said brine tank and piping; means including a float for controlling the admission and exhaust of fluid to actuate the diaphragm of said diaphragm valve; an injector associated with said piping and operable to withdraw brine from said brine tank; means for supplying operating fluid to said injector; said diaphragm valve having passage means communicating with the brine pipe; said diaphragm valve and control means being arranged and constructed so that said diaphragm valve will be opened in consequence of suction induced by said injector when said float is in its upper position and allow the withdrawal of brine from said brine tank, said valve being further constructed and arranged so that it can be closed by atmospheric pressure when said float is lowered a predetermined amount by the withdrawal of brine from said tank, said valve being still further arranged and constructed so that it will again open when a pressure in excess of atmospheric pressure is developed in said brine piping and permit the entrance of fresh water into said brine tank and to again close when said float has been raised a predetermined amount by the water flowing into said brine tank.

18. Fluid distribution apparatus and control means therefor comprising, a housing; a pilot valve in said housing; a clock mechanism for driving said pilot valve; a control knob for winding said clock mechanism; a pressure chamber in said housing surrounding said pilot valve; means for admitting fluid under pressure into said pressure chamber; a fluid distribution device; a plurality of pressure responsive diaphragm valves in said fluid distribution device; and ports in said pilot valve and said fluid distribution device arranged to be placed in communication to allow pressure fluid to flow from said pressure chamber into said fluid distribution device to actuate said diaphragm valves.

19. Fluid distribution apparatus and control means therefor comprising, a housing; a rotatable pilot valve in said housing; a clock mechanism; a control knob connected to simultaneously wind said clock mechanism and rotate said pilot valve from its normal position, said clock mechanism being connected with said pilot valve for slowly returning said pilot valve to its normal position; a pressure chamber in said housing surrounding said pilot valve; a fluid distribution device connected to said housing; a passageway in said fluid distribution device subjected to fluid pressure; passage means connecting said passageway with said pressure chamber; a plurality of pressure responsive diaphragm valves in said fluid distribution device; and ports in said pilot valve and said fluid distribution device arranged to be placed in communication to allow pressure fluid to flow from said pressure chamber into said fluid distribution device to actuate said diaphragm valves.

20. Fluid distribution apparatus and control means therefor comprising, a housing; a pilot valve in said housing; a clock mechanism for driving said pilot valve; a control knob for winding said clock mechanism; a pressure chamber in said housing surrounding said pilot valve; a fluid distribution device; a passageway in said fluid distribution device subjected to fluid pressure; passage means in said housing and fluid distribution device connecting said passageway with said pressure chamber; a plurality of pressure responsive diaphragm valves in said fluid distribution device; ports and passageways in said pilot valve and said fluid distribution device arranged to be placed in communication to allow pressure fluid to flow from said pressure chamber to actuate certain of said diaphragm valves; and other ports and passageways in said pilot valve and said fluid distribution device arranged to exhaust pressure fluid from certain other of said diaphragm valves.

21. In combination, a diaphragm valve; an injector; and piping connecting said diaphragm valve and injector, said diaphragm valve having an outlet opening communicating with said piping; a housing having a pilot valve chamber; conduit means connecting said outlet opening with said pilot valve chamber; a diaphragm chamber in said diaphragm valve; a diaphragm associated with said diaphragm chamber and arranged to control the flow through said diaphragm valve; conduit means connecting said diaphragm chamber with said housing; pilot valve means in said pilot valve chamber for establishing communication between said pilot valve chamber and said diaphragm chamber, whereby when said injector induces suction in said outlet opening the same will be communicated to said diaphragm chamber and thus permit opening of said valve.

22. Water softening apparatus comprising, a softener tank; a brine tank; a fluid distribution unit; a raw water supply pipe, a service pipe for softened water, and a drain pipe connected to said fluid distribution unit; piping connecting said fluid distribution unit with said softener and brine tanks, respectively, said fluid distribution unit having a series of passageways for flow of fluid therethrough and three pairs of valves for controlling the flow through said passageways, said valves and said passageways being relatively arranged so that one pair of valves controls the flow of raw water through said fluid distribution unit from said supply pipe to said softener tank and from said softener tank to said service pipe during normal softening operation, another pair of different valves controls the flow of raw water from said supply pipe to said softener tank and from said softener tank to said drain pipe during backwashing, and a third pair of still different valves controls the flow of brine and rinse water through said fluid distribution unit from said brine tank and raw water supply pipe, respectively, to said softener tank and from said softener tank to said drain pipe during brining and rinsing; and means for successively rendering said pairs of valves effective.

23. Water softening apparatus comprising, a softener tank; a brine tank; a fluid distribution unit; a water supply pipe and a drain pipe connected to said fluid distribution unit; piping connecting said fluid distribution unit with said softener and brine tanks, respectively, said fluid distribution unit housing six diaphragm valves; an injector operatively connected with said fluid distribution unit and said softener and brine tanks, said fluid distribution unit having passageways arranged therein so that one pair of valves controls the flow of raw water in one direction to the softener during normal softening operation, another pair of valves reverses the flow during backwashing, and a third pair of valves again reverses the flow and supplies water to said injector during brining and rinsing; and means for successively rendering said pairs of valves effective.

24. The combination comprising: a solution tank adapted to contain a solution for regenerating a softener tank; piping associated with said solution tank serving as a conduit to conduct solution from said solution tank to a softener tank; an injector operatively connected with said piping; a diaphragm valve connected in said piping between said solution tank and injector, said diaphragm valve having a ported diaphragm chamber and including passage means establishing communication between said piping and said diaphragm chamber, whereby said diaphragm chamber is rendered responsive to the pressure conditions in said piping; and means for supplying fluid to said injector to operate the same to create a suction in said piping and allow said diaphragm valve to open, whereby to permit withdrawal of solution by said injector from said solution tank.

25. The combination comprising: a tank adapted to contain a liquid; piping associated with said tank serving as a conduit to conduct liquid from said tank; an injector operatively connected with said piping; a diaphragm valve connected in said piping between said tank and injector, said diaphragm valve having a ported diaphragm chamber and including passage means establishing communication between said piping and said diaphragm chamber, whereby said diaphragm chamber is rendered responsive to the pressure conditions in said piping; means for supplying fluid to said injector to operate the same to create a suction in said piping and allow said diaphragm valve to open, whereby to permit withdrawal of liquid by said injector from said tank; a pressure responsive valve for controlling the supply of operating fluid to said injector; and a pilot valve for effecting opening and closing of said pressure responsive valve by controlling the application of pressure fluid to and the exhaust of spent fluid from said pressure responsive valve.

26. Water softening apparatus comprising, a softener tank; a brine tank; fluid distribution means comprising a raw water supply pipe, a service pipe for softened water, a drain pipe, six fluid pressure responsive valves and an injector, said valves being operable to open in non-overlapping pairs, two pairs of said valves normally being closed while the remaining pair is open; piping establishing communication between said valves and injector and said softener and brine tanks; a single pilot valve for controlling the operation of said fluid distribution means; means providing conduits for operating fluid disposed between said pilot valve and each of said pressure responsive valves, said pilot valve having a seat with a plurality of ports and a ported pilot disc arranged to maintain pressure upon two pairs of said valves to hold the same closed and at the same time to exhaust pressure fluid from and allow opening of the remaining pair of valves to permit the flow of raw water from said supply pipe to said softener tank and from said softener tank to said service pipe during normal softening operation, to similarly open only a second pair of different valves to control the flow of water from said supply pipe to said softener tank and from said softener tank to said drain pipe during backwashing, and to similarly open only a third pair of still different valves to control the flow of raw water from said supply pipe to said injector to operate said injector to inject brine into said softener tank and to thereafter admit rinse water to said softener tank and to control the flow from said softener tank to said drain pipe during brining and rinsing.

27. Water softening apparatus comprising, a softener tank; a brine tank; a fluid distribution means comprising a raw water supply pipe, a service pipe for softened water, a drain pipe, six pressure responsive diaphragm valves and an injector, said valves being operable as three separate and distinct pairs of valves, two pairs of said valves normally being closed while the third pair is open; piping establishing communication between said valves and injector and said softener and brine tanks; a single pilot valve movable to three operative positions for controlling the operation of said fluid distribution means; means providing conduits for operating fluid between said pilot valve and each of said pressure responsive valves, said pilot valve being ported to maintain pressure upon two pairs of said valves to hold the same closed and at the same time to exhaust pressure fluid from and allow simultaneous opening of only one pair of said valves to control the flow of raw water from said supply pipe to said softener tank and from said softener tank to said service pipe during normal softening operation when in one of said positions, to thereafter allow simultaneous opening of only the valves of a second pair of said valves to control the flow of raw water from said supply pipe to said softener tank and from said softener tank to said drain pipe during backwashing when in another of said positions, and to thereafter allow simultaneous opening of only the valves of a third pair of valves to control the flow of raw water from said supply pipe to said injector to operate said injector to inject brine into said softener tank and to subsequently admit rinse water to said softener tank and to control the flow from said softener tank to said drain pipe during brining and rinsing when in still another of said positions.

28. Water softening apparatus comprising, a softener tank; a brine tank and brine injector means; fluid distribution means comprising a raw water supply pipe, a service pipe for softened water, a drain pipe, and six fluid pressure responsive valves, said valves being operable as three separate and distinct pairs of valves so that no one pair includes a valve of another pair, two pairs of said valves normally being closed while the remaining pair is open; piping establishing communication between said valves and injector means and said softener and brine tanks; a single pilot valve for controlling the operation of said fluid distribution means; means providing conduits for operating fluid disposed between said pilot valve and each of said pressure responsive valves, said pilot valve having a seat with a plurality of ports and a ported pilot disc arranged to exhaust pressure fluid from and allow opening of one pair of valves to allow the flow of raw water from said supply pipe to said softener tank and from said softener tank to said service pipe during normal softening operation, while maintaining the remaining two pairs of valves closed; to similarly open a second pair of different valves to allow the flow of raw water from said supply pipe to said softener tank and from said softener tank to said drain pipe during backwashing, and to similarly open a third pair of different valves to allow the flow of raw water from said supply pipe to said injector means to operate said injector means to inject brine into said softener tank and to thereafter admit rinse water to said softener tank and to allow flow from said softener tank to said drain pipe during brining and rinsing.

29. Water softening apparatus comprising, a water softener tank; a brine tank; a fluid distribution unit; a water supply pipe and a drain pipe connected to said fluid distribution unit; piping connecting said fluid distribution unit with said softener tank and brine tank, respectively, said fluid distribution unit having passageways therein and having a plurality of individual diaphragm valves therein each having a diaphragm for controlling flow through said fluid distribution unit, said passageways and diaphragm valves being arranged to normally admit water into one end of said softener tank during normal softening operation, to admit water into the opposite end of said softener tank to effect backwashing, and to thereafter admit brine from said brine tank and rinse water into said first mentioned end of said softener tank to regenerate and flush the softener bed; and means for controlling the application and exhaust of pressure fluid to one side of the diaphragm of said diaphragm valves for operating said diaphragm valves to effect the flow of water and brine specified, the opposite side of the diaphragm of said diaphragm valves being subject to the pressure of fluid in said passageways.

30. In water softening apparatus, the combination comprising, a softener tank; a fluid distribution unit; piping connecting said fluid distribution unit with the upper and lower ends of said softener tank; a raw water supply pipe connected to said fluid distribution unit; a service pipe for softened water also connected to said fluid distribution unit; a pair of diaphragm valves and passageways for raw and softened water in said fluid distribution unit arranged and constructed so that when said pair of diaphragm valves is open, raw water will flow from the supply pipe and distribution unit to the softener tank and softened water will flow from the softener tank to the distribution unit and supply pipe; and means for admitting fluid under pressure to one face of the diaphragm of each of said pairs of diaphragm valves to close said valves and for exhausting said pressure fluid to allow said valves to open, the opposite face of the diaphragm of each of said pair of diaphragm valves being subject to the pressure of the fluid in the passageways of said fluid distribution unit.

31. Water softening apparatus comprising, a softener tank; a brine tank; a fluid distribution unit; a water supply pipe and a drain pipe connected to said fluid distribution unit; piping connecting said fluid distribution unit with said softener and brine tanks, respectively, said fluid distribution unit having passageways therein and housing six diaphragm valves, each having diaphragm means for controlling flow through said fluid distribution unit, one side of the diaphragm of said diaphragm valves being subject to the fluid pressure in said passageways, said passageways and diaphragm valves being arranged so that one pair of valves controls the flow of raw water in one direction to the softener during normal softening operation, another pair of valves reverses the flow during backwashing, and a third pair of valves again reverses the flow during brining and rinsing; and control means for admitting fluid under pressure to one face of said pair of diaphragm valves to close said valves against the pressure of fluid in the passageways of said fluid distribution device and for relieving the pressure fluid acting on said last mentioned face of said diaphragm valves to permit said valves to open in response to the pressure of fluid in said passageways.

32. Water softening apparatus comprising, a softener tank; a brine tank and brine injector means; fluid distribution means comprising a raw water supply pipe, a service pipe for softened water, a drain pipe, and six flow control valves; piping establishing communication between said valves and said injector means and said softener and brine tanks, said valves being operable as three separate and distinct pairs of valves so that no one pair includes a valve of another pair, said valves being arranged so that two pairs of said valves are normally closed while the remaining pair is open; and means for controlling the opening and closing of said pairs of valves, said valves being arranged so that the opening of a given pair of said valves allows the flow of raw water from said supply pipe to said softener tank and from said softener tank to said service pipe during normal softening operation and while the remaining two pairs of valves are closed, the opening of a second given pair of different valves allows the flow of raw water from said supply pipe to said softener tank and from said softener tank to said drain pipe during backwashing and while the remaining two pairs of valves are closed, and the opening of a third given pair of different valves allows the flow of raw water from said supply pipe to said injector means to operate said injector means to inject brine into said softener tank and to thereafter admit rinse water to said softener tank and to allow flow from said softener tank to said drain pipe during brining and rinsing and while the remaining two pairs of valves are closed.

33. Water softening apparatus comprising, a softener tank, a brine tank; a brine injector between said softener tank and said brine tank; means operable to shut off the supply of brine to said injector after a given volume of brine has been withdrawn from said brine tank; fluid distribution means comprising a raw water supply pipe, a service pipe for softened water, a drain pipe, and six flow control valves; piping establishing communication between said valves and said injector and said softener and brine tanks, said valves being operable as three separate and distinct pairs of valves so that no one pair includes a valve of another pair, said valves being arranged so that two pairs of said valves are normally closed while the remaining pair is open; and means for controlling the opening and closing of said pairs of valves, said valves being arranged so that the opening of a given pair of said valves allows the flow of raw water from said supply pipe to said softener tank and from said softener tank to said service pipe during normal softening operation and while the remaining two pair of valves are closed, the opening of a second given pair of different valves allows the flow of raw water from said supply pipe to said softener tank and from said softener tank to said drain pipe during backwashing and while the remaining two pairs of valves are closed, and the opening of a third given pair of different valves allows the flow of raw water from said supply pipe to said injector to operate said injector to withdraw brine from said brine tank and to inject the same into said softener tank and to allow flow from said softener tank to said drain pipe, and after the supply of brine has been shut off, to admit rinse water to said softener tank and to allow further flow from said softener tank to said drain pipe, all while the remaining two pairs of valves are closed.

DONALD G. GRISWOLD.